(12) United States Patent
Ohnemus et al.

(10) Patent No.: US 11,181,213 B2
(45) Date of Patent: Nov. 23, 2021

(54) PIPE COUPLING WITH PIPE CONNECTION RINGS

(71) Applicant: ASC Engineered Solutions, LLC, Exeter, NH (US)

(72) Inventors: Gregory Nicholas Stagliano Ohnemus, Providence, RI (US); Patrick Chien Chen, North Kingstown, RI (US); Stephen Eric Scott, North Kingstown, RI (US); Matthew William McNamara, Portsmouth, RI (US); Michael T. Thornley, II, Johnston, RI (US)

(73) Assignee: ASC Engineered Solutions, LLC, Exeter, NH (US)

( * ) Notice: Subject to any disclaimer, the term of this patent is extended or adjusted under 35 U.S.C. 154(b) by 0 days.

(21) Appl. No.: 16/836,294

(22) Filed: Mar. 31, 2020

(65) Prior Publication Data

US 2020/0224803 A1    Jul. 16, 2020

Related U.S. Application Data

(63) Continuation of application No. 15/378,138, filed on Dec. 14, 2016, now Pat. No. 10,641,419.

(51) Int. Cl.
*F16L 17/04*      (2006.01)
*F16L 21/06*      (2006.01)
(Continued)

(52) U.S. Cl.
CPC ............. *F16L 17/04* (2013.01); *F16L 21/065* (2013.01); *F16L 21/005* (2013.01); *F16L 21/08* (2013.01)

(58) Field of Classification Search
CPC ......... F16L 17/04; F16L 21/005; F16L 21/04; F16L 21/065; F16L 21/08; F16L 37/091
(Continued)

(56) References Cited

U.S. PATENT DOCUMENTS

| 1,541,601 | A | 6/1925 | Tribe |
| 3,351,352 | A | 11/1967 | Blakeley et al. |

(Continued)

FOREIGN PATENT DOCUMENTS

| DE | 10006029 | 8/2001 |
| GB | 2218768 | 11/1989 |

(Continued)

OTHER PUBLICATIONS

Ohnemus, Gregory Nicholas Stagliano; Non-Final Office Action for U.S. Appl. No. 15/378,125, filed Dec. 14, 2016, dated Mar. 27, 2020, 36 pgs.

(Continued)

*Primary Examiner* — Zachary T Dragicevich
(74) *Attorney, Agent, or Firm* — Taylor English Duma LLP

(57) ABSTRACT

A pipe coupling includes first and second coupling segments, an inner surface of each of the first and second coupling segments defining first and second ring grooves, the inner surface of each of the first and second coupling segments including transition portions on either side of the respective ring grooves, each of the first and second ring grooves defining a groove bottom surface positioned radially outward from each of the respective transition portions; a first pipe connection ring disposed within the first ring groove and a second pipe connection ring disposed within the second ring groove, each of the respective pipe connection rings including: an outer flange aligned with an axial direction of the respective pipe connection ring and received (Continued)

within the respective ring groove; and an inner flange connected to the outer flange and angled with respect to the outer flange.

8 Claims, 23 Drawing Sheets

(51) Int. Cl.
*F16L 21/00* (2006.01)
*F16L 21/08* (2006.01)

(58) Field of Classification Search
USPC .................................................. 285/112, 373
See application file for complete search history.

(56) References Cited

U.S. PATENT DOCUMENTS

| | | | |
|---|---|---|---|
| 3,454,287 | A | 7/1969 | Thiessen |
| 4,522,434 | A | 6/1985 | Webb |
| 5,498,042 | A | 3/1996 | Dole |
| 5,911,446 | A | 6/1999 | McLennan et al. |
| 6,170,884 | B1 | 1/2001 | McLennan et al. |
| 6,312,025 | B1 | 11/2001 | Wolfsdorf |
| 6,502,865 | B1 * | 1/2003 | Steele .................... F16L 17/04 285/112 |
| 7,086,131 | B2 | 8/2006 | Gibb et al. |
| 7,950,701 | B2 | 5/2011 | Dole et al. |
| 8,282,136 | B2 | 10/2012 | Vandal et al. |
| 8,517,430 | B2 | 8/2013 | Dole et al. |
| 8,733,799 | B2 | 5/2014 | Gibb et al. |
| 10,641,419 | B2 | 5/2020 | Ohnemus |
| 10,851,928 | B1 | 12/2020 | Lu et al. |
| 2006/0214422 | A1 | 9/2006 | Cuvo et al. |
| 2008/0284159 | A1 | 11/2008 | Krehl |
| 2010/0025992 | A1 | 2/2010 | Spence |
| 2010/0194104 | A1 | 8/2010 | Hennemann et al. |
| 2012/0248767 | A1 | 10/2012 | Lippka |
| 2013/0187345 | A1 | 7/2013 | Beagan, Jr. |
| 2013/0257045 | A1 | 10/2013 | Mikami |
| 2015/0176728 | A1 | 6/2015 | Bowman |
| 2018/0163905 | A1 | 6/2018 | Ohnemus et al. |
| 2018/0163906 | A1 | 6/2018 | Ohnemus et al. |
| 2020/0032934 | A1 | 1/2020 | Belen et al. |

FOREIGN PATENT DOCUMENTS

| | | |
|---|---|---|
| WO | 0159350 | 8/2001 |
| WO | 2020183480 | 9/2020 |

OTHER PUBLICATIONS

Ohnemus, Gregory Nicholas Stagliano; Requirement for Restriction/Election for U.S. Appl. No. 15/378,125, filed Dec. 14, 2016, dated Jun. 21, 2019, 9 pgs.

Ohnemus, Gregory Nicholas Stagliano; Applicant-Initiated Interview Summary for U.S. Appl. No. 15/378,138, filed Dec. 14, 2016, dated Jul. 16, 2019, 7 pgs.

Ohnemus, Gregory Nicholas Stagliano; Final Office Action for U.S. Appl. No. 15/378,138, filed Dec. 14, 2016, dated Oct. 8, 2019, 14 pgs.

Ohnemus, Gregory Nicholas Stagliano; Notice of Allowance for U.S. Appl. No. 15/378,138, filed Dec. 14, 2016, dated Jan. 9, 2020, 5 pgs.

Ohnemus, Gregory Nicholas Stagliano; Requirement for Restriction/Election for U.S. Appl. No. 15/378,138, filed Dec. 14, 2016, dated Jan. 17, 2019, 8 pgs.

Ohnemus, Gregory Nicholas Stagliano; Supplemental Notice of Allowance for U.S. Appl. No. 15/378,138, filed Dec. 14, 2016, dated Apr. 3, 2020, 7 pgs.

Ohnemus, Gregory Nicholas Staliano; Non-Final Office Action for U.S. Appl. No. 15/378,138, filed Dec. 14, 2016, dated Apr. 19, 2019, 19 pgs.

Ohnemus, Gregory Nicholas Stagliano; Non-Final Office Action for U.S. Appl. No. 15/378,125, filed Dec. 14, 2016, dated Feb. 3, 2021, 30 pgs.

Belen, Jordan Cameron; Requirement for Restriction/Election for U.S. Appl. No. 16/591,156, filed Oct. 2, 2019, dated Feb. 23, 2021, 8 pgs.

Ohnemus, Gregory Nicholas Stagliano; Non-Final Office Action for U.S. Appl. No. 15/378,125, filed Dec. 14, 2016, dated Jul. 21, 2021, 35 pgs.

* cited by examiner

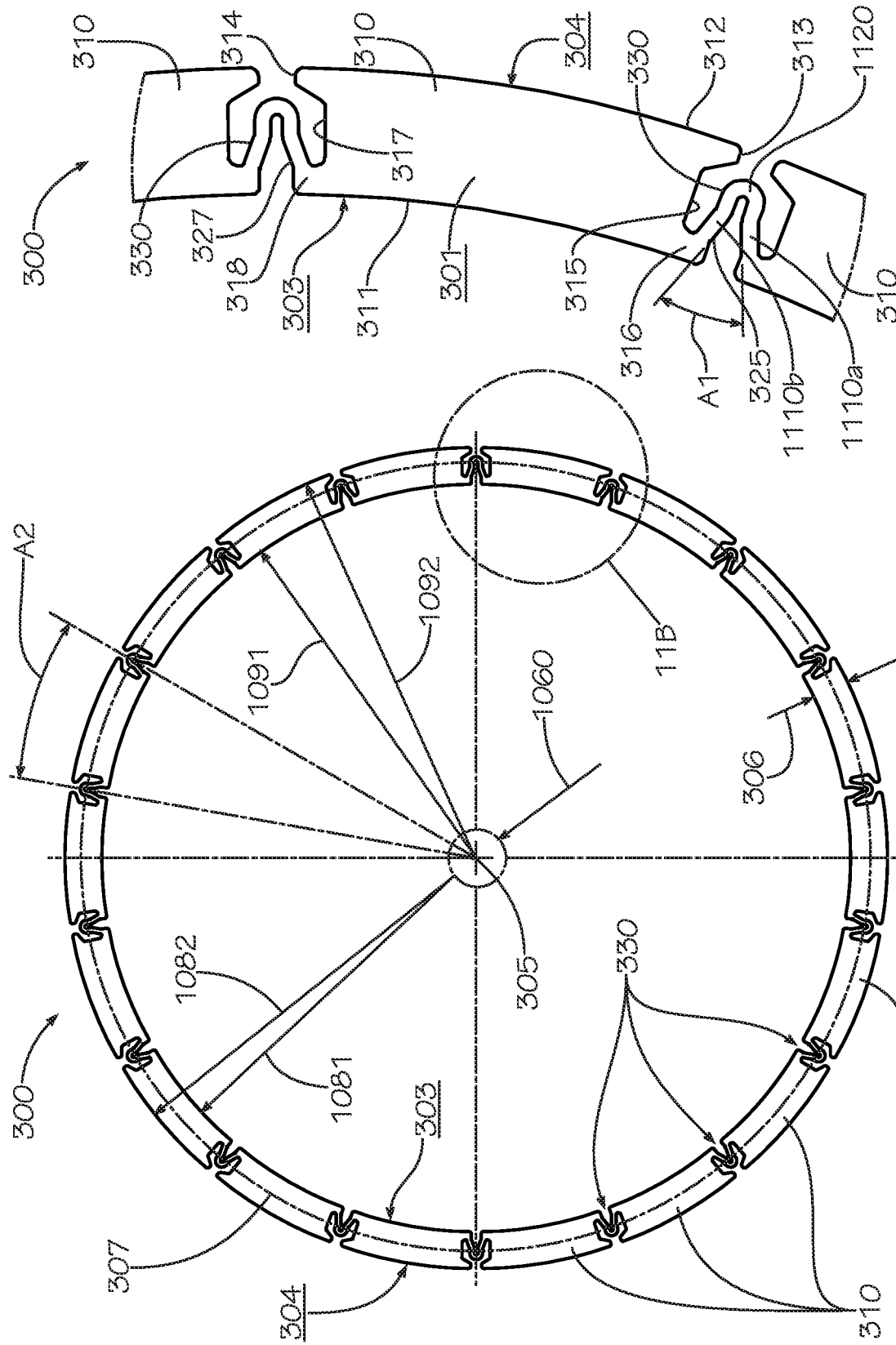

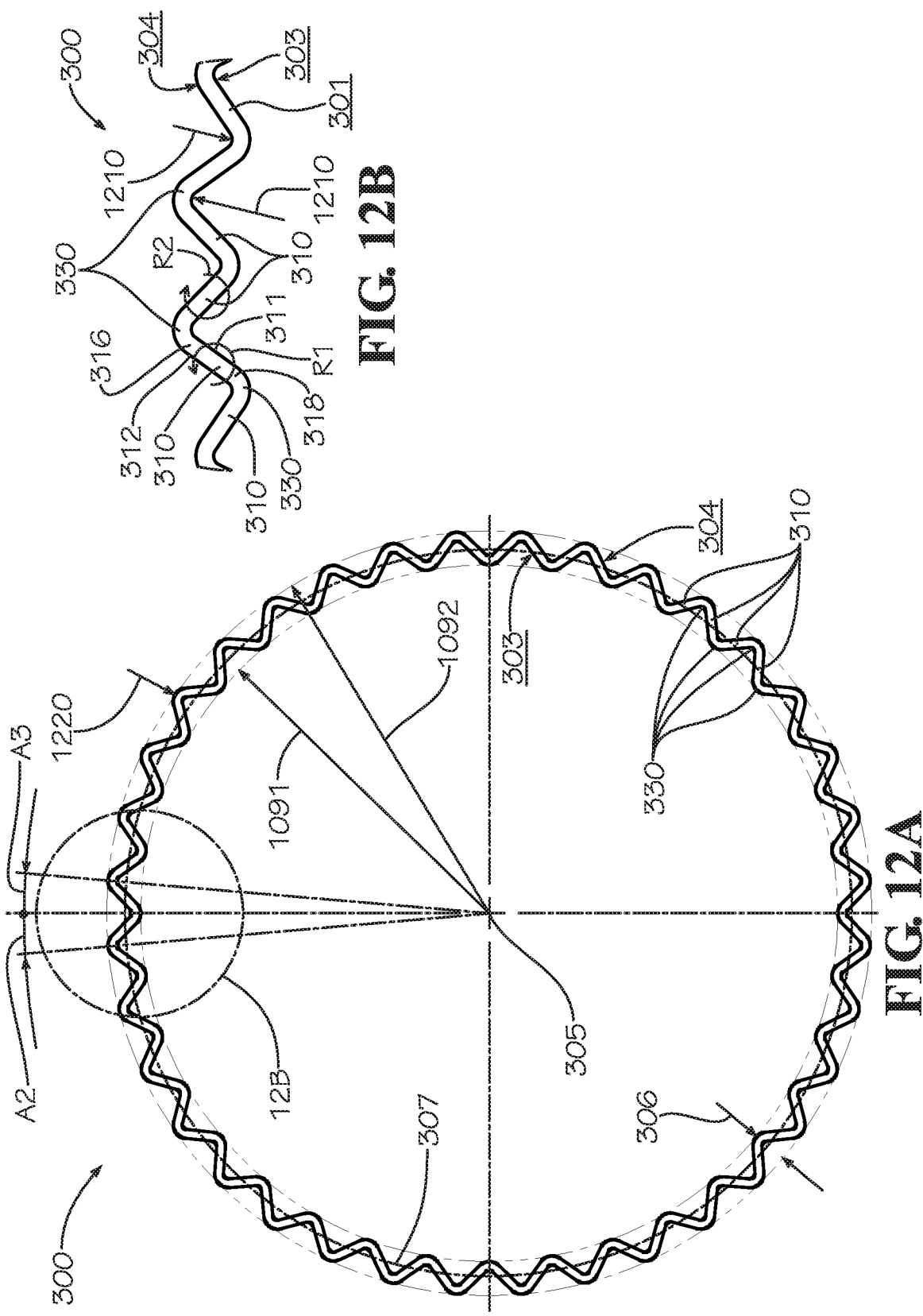

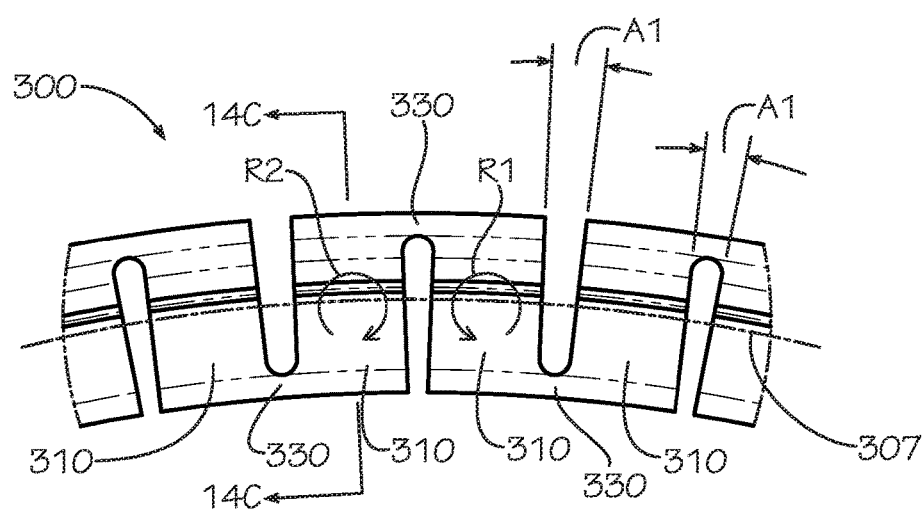
FIG. 14B
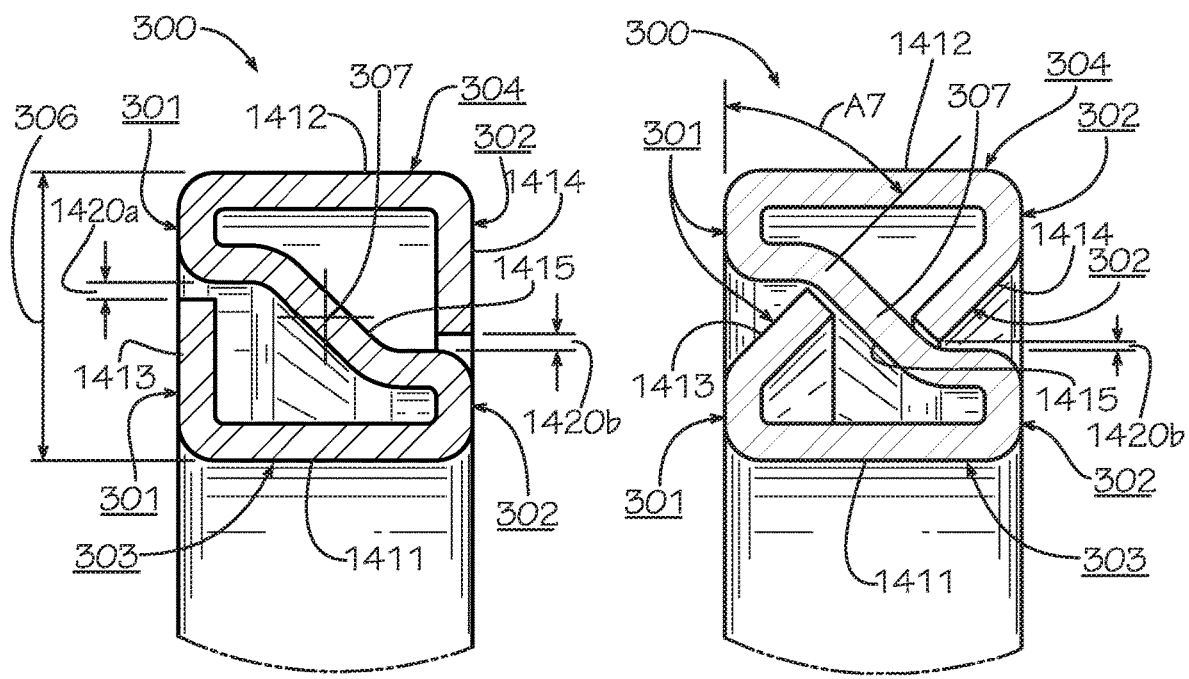
FIG. 14C  FIG. 14D

PIPE COUPLING WITH PIPE CONNECTION RINGS

REFERENCE TO RELATED APPLICATIONS

This application is a continuation of U.S. application Ser. No. 15/378,138, filed Dec. 14, 2016, which issued into U.S. Pat. No. 10,641,419 on May 5, 2020, which is hereby specifically incorporated by reference herein in its entirety.

FIELD OF USE

This disclosure relates to piping. More specifically, this disclosure relates to pipe couplings.

RELATED ART

Pipe elements such as pipes, valves, and meters typically are not made of one piece. Rather, such pipe elements are formed in finite lengths and must be joined. One way of joining such pipe elements is with a pipe coupling. The pipe coupling typically includes a sealing member such as a gasket. Pipe couplings can be difficult to install, typically requiring the installation to both effectively seal a joint between the pipe elements and to prevent separation of the pipe elements against various internal or external forces.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a pipe system comprising: a first pipe element; a second pipe element; and a pipe coupling connecting an end of the second pipe element to an end of the first pipe element, the pipe coupling comprising: a first coupling segment defining an inner surface; a second coupling segment defining an inner surface, the inner surface of the first coupling segment and the inner surface of the second coupling segment defining: a first ring groove proximate to a first axial end of each of the first coupling segment and the second coupling segment, the inner surface of the first coupling segment and the inner surface of the second coupling segment comprising a transition portion on either axial side of the first ring groove, the first ring groove defining a groove bottom surface positioned radially outward from each of the transition portions; and a second ring groove proximate to a second axial end of each of the first coupling segment and the second coupling segment, the inner surface of the first coupling segment and the inner surface of the second coupling segment comprising a transition portion on either side of the second ring groove, the second ring groove defining a groove bottom surface positioned radially outward from each of the transition portions proximate to the second ring groove; a first pipe connection ring disposed within the first ring groove and engaged with the first pipe element, the first pipe connection ring comprising: an outer flange of the first pipe connection ring aligned with an axial direction of the first pipe connection ring and received within the first ring groove; and an inner flange of the first pipe connection ring connected to the outer flange and angled with respect to the outer flange; and a second pipe connection ring disposed within the second ring groove and engaged with the second pipe element, the second pipe connection ring comprising: an outer flange of the second pipe connection ring aligned with an axial direction of the second pipe connection ring and received within the second ring groove; and an inner flange of the second pipe connection ring connected to the outer flange of the second pipe connection ring and angled with respect to the outer flange of the second pipe connection ring.

In a further aspect, also disclosed is a pipe coupling comprising: a first coupling segment defining an inner surface; a second coupling segment defining an inner surface, the inner surface of the first coupling segment and the inner surface of the second coupling segment defining: a first ring groove proximate to a first axial end of each of the first coupling segment and the second coupling segment, the inner surface of the first coupling segment and the inner surface of the second coupling segment comprising a transition portion on either side of the first ring groove, the first ring groove defining a groove bottom surface positioned radially outward from each of the transition portions; and a second ring groove proximate to a second axial end of each of the first coupling segment and the second coupling segment, the inner surface of the first coupling segment and the inner surface of the second coupling segment comprising a transition portion on either side of the second ring groove, the second ring groove defining a groove bottom surface positioned radially outward from each of the transition portions proximate to the second ring groove; a first pipe connection ring disposed within the first ring groove, the first pipe connection ring comprising: an outer flange of the first pipe connection ring aligned with an axial direction of the first pipe connection ring and received within the first ring groove; and an inner flange of the first pipe connection ring connected to the outer flange and angled with respect to the outer flange; and a second pipe connection ring disposed within the second ring groove, the second pipe connection ring comprising: an outer flange of the second pipe connection ring aligned with an axial direction of the second pipe connection ring and received within the second ring groove; and an inner flange of the second pipe connection ring connected to the outer flange of the second pipe connection ring and angled with respect to the outer flange of the second pipe connection ring.

In yet another aspect, also disclosed is a method of installing a pipe coupling to connect a first pipe element to a second pipe element, the method comprising: sliding a pipe coupling over an end of the first pipe element, the pipe coupling comprising: a first coupling segment defining an inner surface; a second coupling segment defining an inner surface, the inner surface of the first coupling segment and the inner surface of the second coupling segment defining: a first ring groove proximate to a first axial end of each of the first coupling segment and the second coupling segment, the inner surface of the first coupling segment and the inner surface of the second coupling segment comprising a transition portion on either side of the first ring groove, the first ring groove defining a groove bottom surface positioned radially outward relative to an axis of the pipe coupling from each of the transition portions; and a second ring groove proximate to a second axial end of each of the first coupling segment and the second coupling segment, the inner surface of the first coupling segment and the inner surface of the second coupling segment comprising a transition portion on either side of the second ring groove, the second ring groove defining a groove bottom surface positioned radially outward relative to an axis of the pipe coupling from each of the transition portions proximate to the second ring groove; a first pipe connection ring disposed within the first ring groove, the first pipe connection ring comprising: an outer flange of the first pipe connection ring aligned with an axial direction of the first pipe connection ring and received within the first ring groove; and an inner flange of the first pipe connection ring connected to the outer flange and angled with respect to the outer flange; and a second pipe connection ring disposed within the second ring groove, the second pipe connection ring comprising: an outer flange of the second pipe connection ring aligned with an axial direction of the second pipe connection ring and received within the second ring groove; and an inner flange of the second pipe connection ring connected to the outer flange of the second pipe connection ring and angled with respect to the outer flange of the second pipe connection ring; sliding the pipe coupling over an end of the second pipe element; and tightening the pipe coupling to engage the pipe connection ring with each of the first pipe element and the second pipe element.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the invention and together with the description, serve to explain various principles of the invention. The drawings are not necessarily drawn to scale. Corresponding features and components throughout the figures may be designated by matching reference characters for the sake of consistency and clarity.

FIG. 11A is a front view of a pipe connection ring in accordance with another aspect of the current disclosure.

FIG. 11B is a detail view of the pipe connection ring of FIG. 11A taken from detail 11B of FIG. 11A.

FIG. 12A is a front view of a pipe connection ring in accordance with another aspect of the current disclosure.

FIG. 12B is a detail view of the pipe connection ring of FIG. 12A taken from detail 12B of FIG. 12A.

FIG. 14B is a detail view of the pipe connection ring of FIG. 14A taken from detail 14B of FIG. 14A.

FIG. 14C is a sectional view of the pipe connection ring of FIG. 14A taken along line 14C-14C of FIG. 14B.

FIG. 14D is a sectional view of the pipe connection ring of FIG. 14A taken along line 14C-14C of FIG. 14B in accordance with another aspect of the current disclosure.

DETAILED DESCRIPTION

Figure 1:
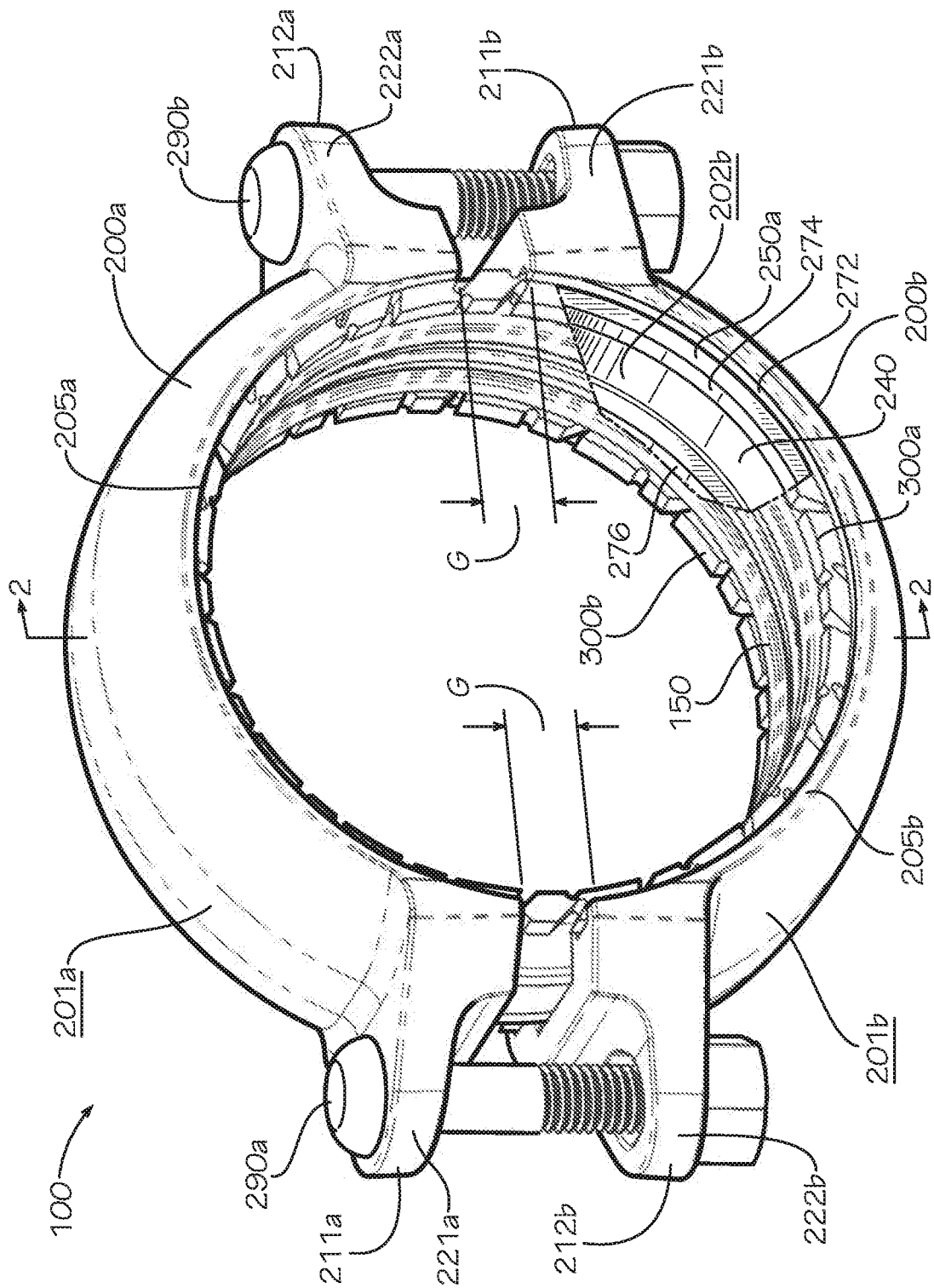
FIG. 1 is a perspective view of a pipe coupling in accordance with one aspect of the current disclosure.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the one aspect of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a coupling segment" can include two or more such coupling segments unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

In one aspect, a pipe coupling used to join two pipe elements employs a housing comprising two approximately semicircular coupling segments joined together with nuts and bolts at each end. The housing is often used to secure two lengths of pipe together. In order to prevent leaking between the two pipes, a gasket is often secured around a joint created at the junction of the two pipes. The two coupling segments of the housing surround the gasket and press the gasket around the joint. It is contemplated that a pipe coupling such as that disclosed herein can have more than two coupling segments—for example and without limitation, three coupling segments, each occupying an arc length of approximately 120°; or four coupling segments, each occupying an arc length of approximately 90°. It is also contemplated that a pipe coupling such as that disclosed herein can have a single coupling segment that is able to slide over an end of a pipe element but which occupies an arc length of as much as 360° when tightened.

Pipe couplings are often cast. Certain features of cast parts may vary in size from one part to another or have surfaces that are rougher or have material properties that are different than if the parts—or certain features of those parts—were processed using a different method such as forging, machining, or stamping. In one aspect, securing the coupling segments to end-facing pipe elements using specifically one or more separate pipe connection rings that are disclosed herein can yield benefits to those who install, service, and otherwise rely on the convenience and integrity of the pipe connections.

With previous pipe coupling designs, workers must sometimes follow a significant number of steps to install a pipe coupling. Workers must typically disassemble the entire apparatus and remove the gasket from the housing. Approximately half of the gasket is then forced over one end of one pipe. An end of the other pipe is forced into the remaining portion of the gasket, thereby joining the two pipes together. To secure the pipes, the two halves of the housing are placed around the gasket and then nuts and bolts or other fastening devices are used to complete the installation. Typically, the inner diameter of the gasket is slightly smaller than the outer diameter of the pipes. Therefore, the worker must stretch the gasket around the pipe ends.

In one aspect, a pipe coupling and associated methods, systems, devices, and various apparatus are described herein that do not require the disassembly and assembly steps described immediately above. In one aspect, the pipe coupling comprises a pipe connection ring. In a further exemplary aspect, the pipe connection ring is compressible in a radial direction.

Figure 2:
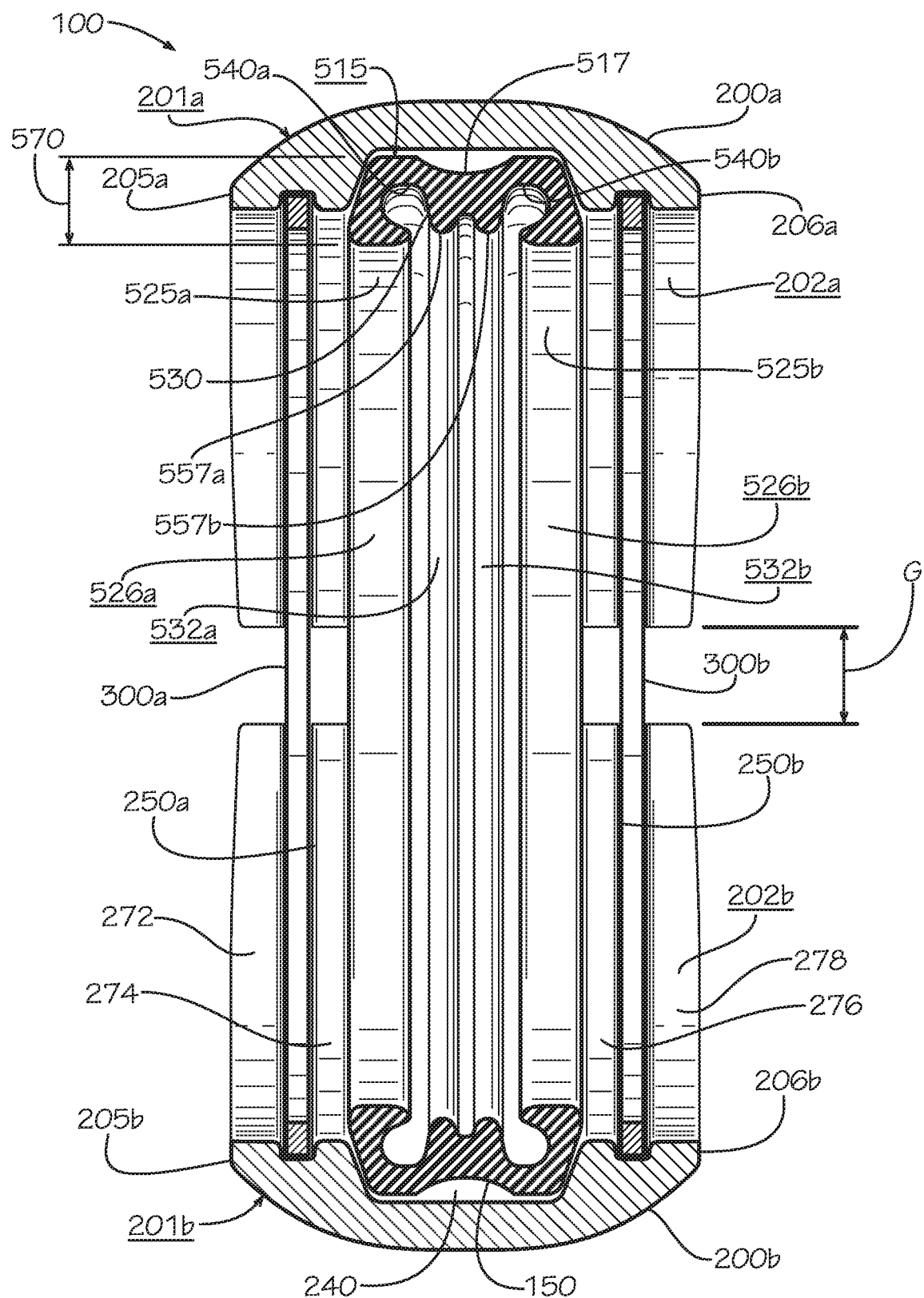
FIG. 2 is a sectional view of the pipe coupling of FIG. 1 taken along line 2-2 of FIG. 1.

In one aspect and as shown in FIGS. 1 and 2, the pipe coupling 100 includes new features not previously disclosed and/or eliminates other features. In one aspect, the pipe coupling 100 comprises a pair of coupling segments 200a,b, a gasket 150, a pair of pipe connection rings 300a,b, and a pair of fastening devices 290a,b. In one aspect, each of the coupling segments 200a,b of the pipe coupling 100 comprises a first end 211a,b, a second end 212a,b, an outer surface 201a,b, and an inner surface 202a,b (shown in FIG. 2). In one aspect and as shown in FIG. 2, each of the outer surfaces 201a,b is contoured to define a gently arched shape that is higher (or more radially outward) towards an axial midpoint of each coupling segment 200 and lower (or more radially inward) towards each of a pair of axial ends of each coupling segment 200. Shown in an assembled but non-tightened state, the pipe coupling 100 of FIGS. 1 and 2 is shown with a noticeable gap G between the coupling segment 200a and the coupling segment 200b. In one aspect, the pipe connection rings 300a,b are respectively positioned in or disposed within a first ring groove 250a and a second ring groove 250b (shown in FIG. 2) defined in the inner surfaces 202a,b of the coupling segments 200a,b. In one aspect, the first ring groove 250a is proximate to a first axial end 205a,b of the coupling segments 200a,b and the second ring groove 250b is proximate to a second axial end 206a,b (shown in FIG. 2) of the coupling segments 200a,b. In one aspect, the gasket is positioned in or disposed within a gasket groove 240 defined in the inner surfaces 202a,b of the coupling segments 200a,b. Each of the inner surfaces 202a,b also defines a transition portion 272, a transition portion 274, a transition portion 276, and a transition portion 278. The transition portion 272 provides a transition between the first axial end 205a,b and the first ring groove 250a; the transition portion 274 provides a transition between the first ring groove 250a and the gasket groove 240; the transition portion 276 provides a transition between the gasket groove 240 and the second ring groove 250b; and the transition portion 278 provides a transition between the second ring groove 250b and the second axial end 206a,b. In one aspect, each of the coupling segments 200a,b comprises a first fastener pad 221a,b and a second fastener pad 222a,b proximate to the first end 211a,b and the second end 212a,b, respectively. Various detailed characteristics and functions of the pipe connection rings 300a,b will be described in connection with the description of FIGS. 10A through 14D.

In one aspect and as shown in FIG. 2, the gasket 150 comprises, for example and without limitation, a pair of sealing ridges 525a,b, a central rib 530 defining sealing members 557a,b, a deformation groove 517, a pair of gasket channels 540a,b—alternately described as pockets, the gasket channel 540a proximate to the sealing ridge 525a and the gasket channel 540b proximate to the sealing ridge 525b. In one aspect, the gasket 150 is received within the gasket groove 240 and each of the pipe connection rings 300a,b, shown in simplified form for the sake of clarity, is respectively received within the ring grooves 250a,b. In one aspect, in cross-section, the gasket 150 defines an overall height 570 measured in a radial direction from a radially outer surface 515 to a pair of sealing surfaces 526a,b of the sealing ridges 525a,b.

Figure 17:
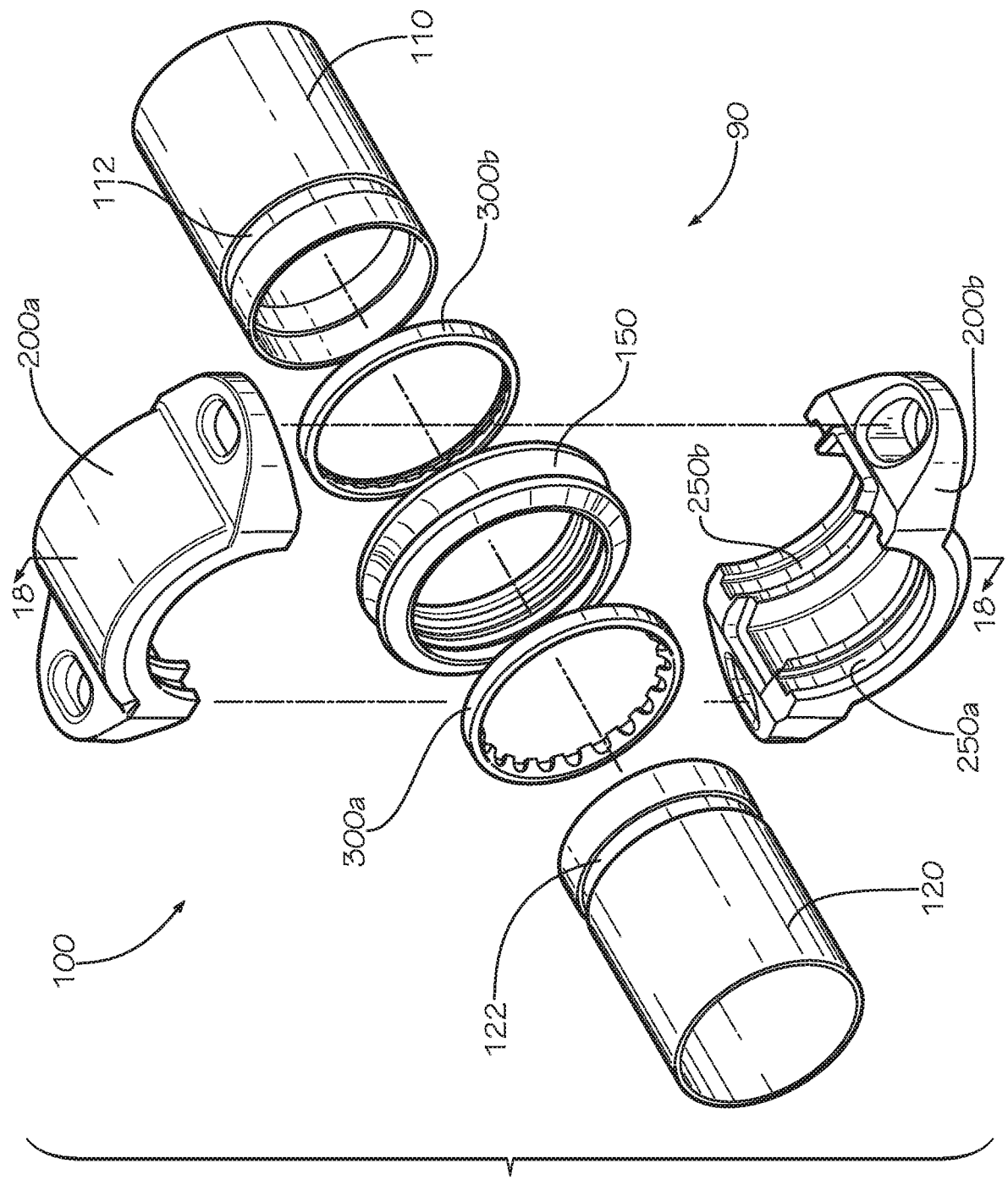
FIG. 17 is a perspective exploded view of a pipe system using the pipe connection ring of FIG. 15 in accordance with one aspect of the current disclosure.

In one aspect, the gasket 150 is ring-shaped (as shown in FIG. 17) with various axially outer drafted edges and axially inward drafted edges defined on the sealing ridges 525a,b. The pair of sealing surfaces 526a,b of the sealing ridges 525a,b, respectively, are intended to contact pipe elements placed inside of the gasket 150 to provide a fluid seal for the pipe elements. The sealing surfaces 526a,b face radially inwardly and extend substantially axially at rest, thereby being coannular with each other. Accordingly, in one aspect, the shape of each of the sealing surfaces 526a,b approximates a cylinder that is about coaxial with the pipe elements intended to be used with the pipe coupling 100. Thus, the sealing surfaces 526a,b appear as lines that are parallel with an axial direction of the gasket 150 and an axial direction of the pipe elements 110,120 in cross-sectional view, as seen in FIGS. 19A-19E. Any angle with respect to the pipe elements 110,120 is minimal. The axial ends of each sealing surface 526a,b may be rounded or chamfered or otherwise shaped to ease the insertion of pipe elements 110,120.

The gasket 150 may be made of rubber, plastic, cork, wood, metal, ceramic, polymer, elastomer, rosin, foam, any combination of the foregoing materials, or any material suitable for sealing two pipe elements joined in end-to-end relationship. A "pipe element" can include, for example and without limitation, pipes, valves, meters, fittings, or any other piping structure suitable to be sealed.

The gasket 150 defines the gasket channels 540a,b. The gasket channels 540a,b are pockets into which fluid media may flow when the gasket 150 is in use. The gasket channels 540a,b are tubular channels in the current embodiment but may be various shapes in various embodiments. When placed in sealing contact with an exterior surface of a pipe element, the gasket channels 540a,b allow some fluid pressure to aid in sealing the sealing ridges 525a,b against the pipe elements 110,120 by exerting pressure against an axially outer surface of the sealing ridges 525a,b, although such use is not necessary for successful sealing of the gasket 150. The central rib 530 decreases in thickness from a radially outermost portion to its termination radially inward.

In addition, when the gasket 150 is in use, the sealing members 557a,b act to prevent substantial fluid media flow into the gasket channels 540a,b. When placed in sealing contact with exterior surfaces of pipe elements, a pair of sealing surfaces 532a,b of the sealing members 557a,b prevent substantial fluid media flow into gasket channels 540a,b, retaining fluid media flow in a groove between the sealing members 557a,b. The gasket, in alternative embodiments, may comprise a plurality of central ribs, each with at least one sealing member and at least one sealing surface, which perform the same function as described above to prevent substantial media flow into the gasket channels. One problem that the central rib 530 can alleviate is the buildup of fluids in the gasket channels 540a,b. For example, in applications where fluid media is water in cold temperature environments, preventing water buildup in the gasket channels 540a,b can lead to damage to the gasket 150 if the water freezes and, thereby, expands.

Figure 3:
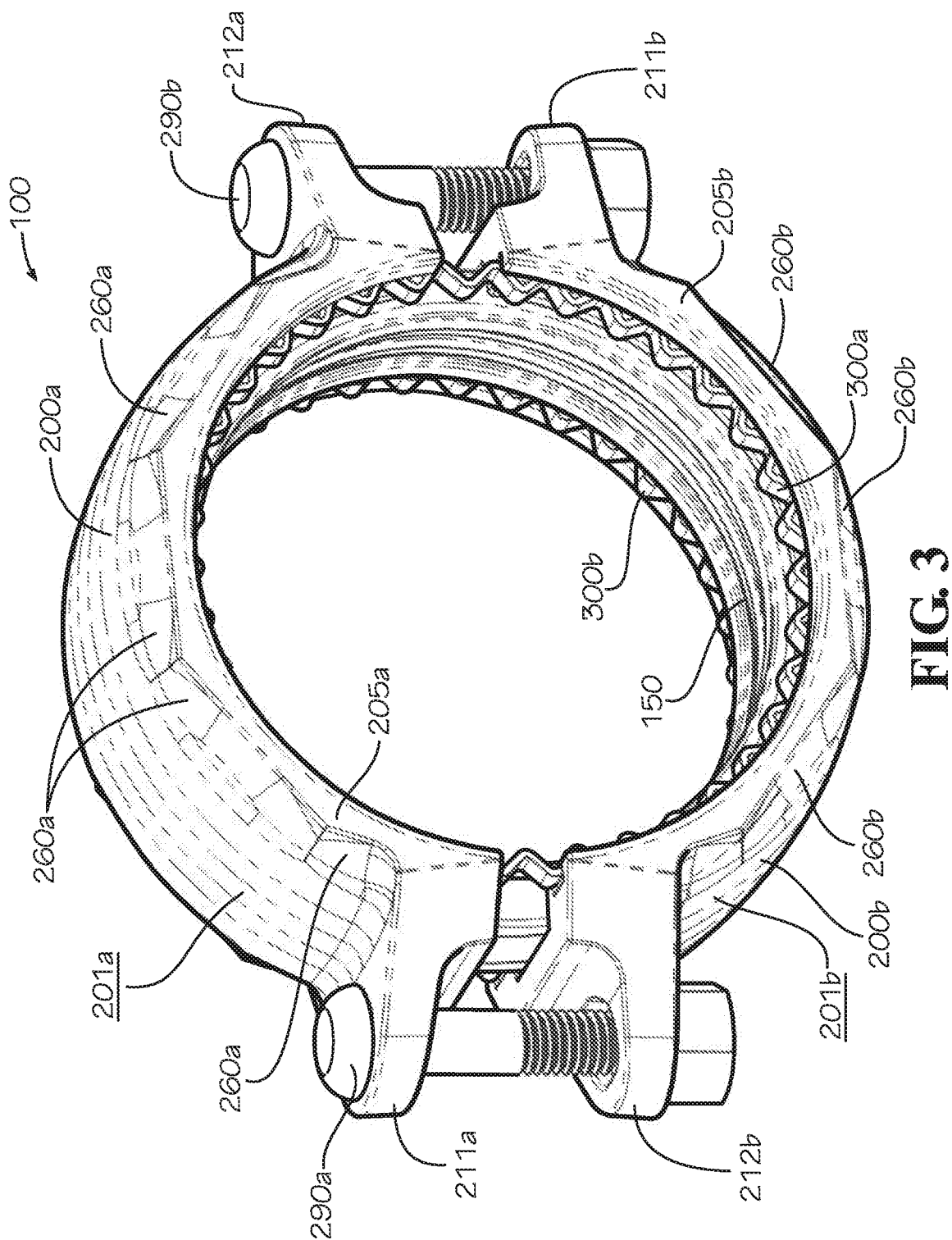
FIG. 3 is a perspective view of a pipe coupling in accordance with another aspect of the current disclosure.
Figure 4:
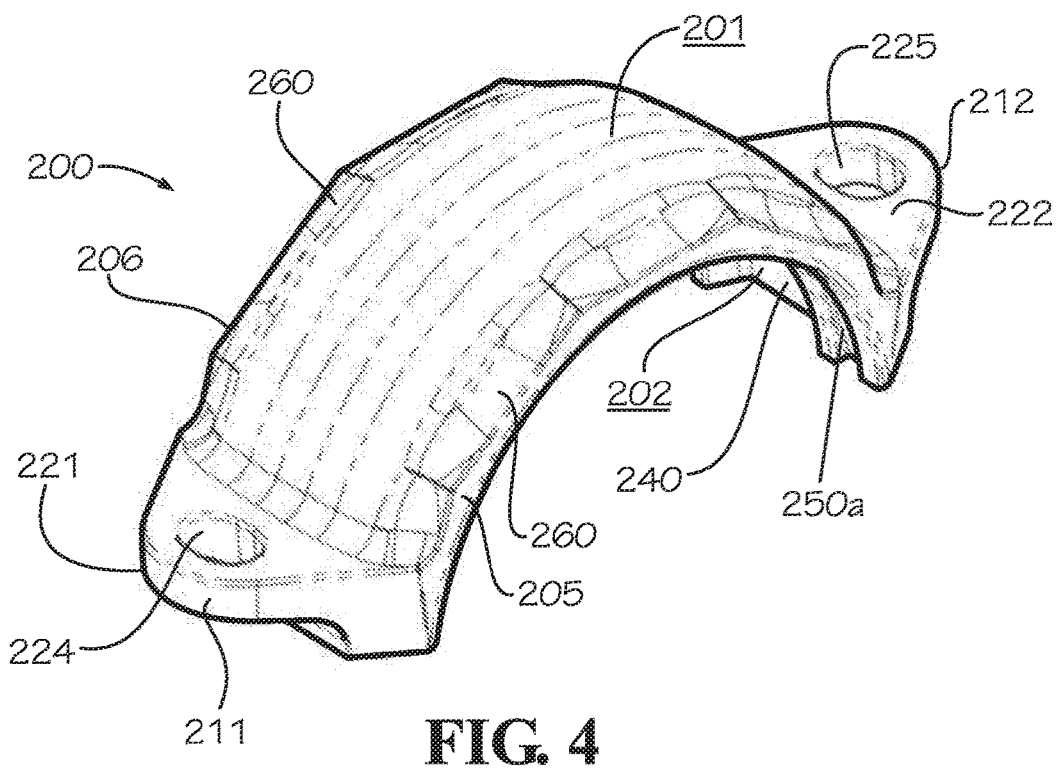
FIG. 4 is a perspective view of a coupling segment of the pipe coupling of FIG. 3 in accordance with one aspect of the current disclosure.

In one aspect and as shown in FIG. 3, the pipe coupling 100—including the coupling segments 200a,b—comprises new features not previously disclosed and/or eliminates other features. In the current aspect, the coupling segments 200a,b respectively define outer surfaces 201a,b and inner surfaces 202a,b that differ in various aspects to the outer surfaces 201a,b and inner surfaces 202a,b of the coupling segments 200a,b of FIGS. 1 and 2. In particular, the gently arched shape of the outer surfaces 201a,b is broken towards each of the axial ends 205,206 of each coupling segment 200 by a plurality of edge treatments 260a,b corresponding to a plurality of groove bottom segments 270 shown in FIGS. 7-8. In one aspect, the edge treatments 260a,b are planar surfaces that help maintain a more constant thickness of the coupling segment in portions of the coupling segment defining the ring grooves 250a,b. In one aspect, this ensures that the pipe coupling does not become too thin in any one area. In another aspect, this reduces the amount of material used to form each of the coupling segments 200a,b to only the amount required the minimum thickness. In another aspect, a more constant thickness improves the manufacturability of the coupling segments 200a,b by facilitating more even cooling of a coupling segment after it has been cast or molded. As will be described in connection with the description of FIGS. 12A-12C, each of the pair of pipe connection rings 300a,b of FIG. 3 exhibits characteristics that differ from the characteristics of the pipe connection rings 300a,b of FIGS. 1 and 2.

Figure 5:
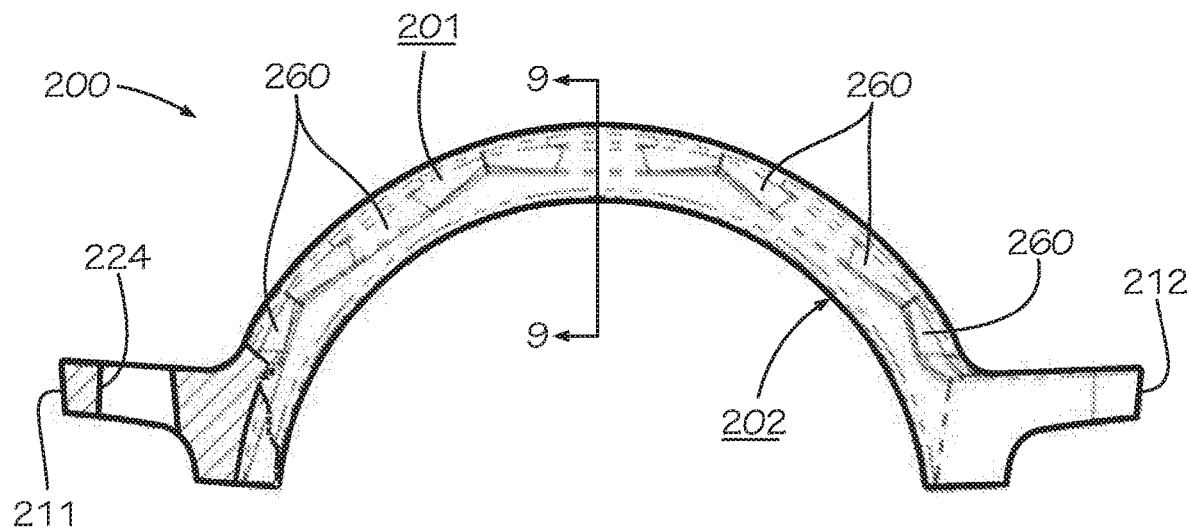
FIG. 5 is a side view of the coupling segment of FIG. 4.
Figure 6:
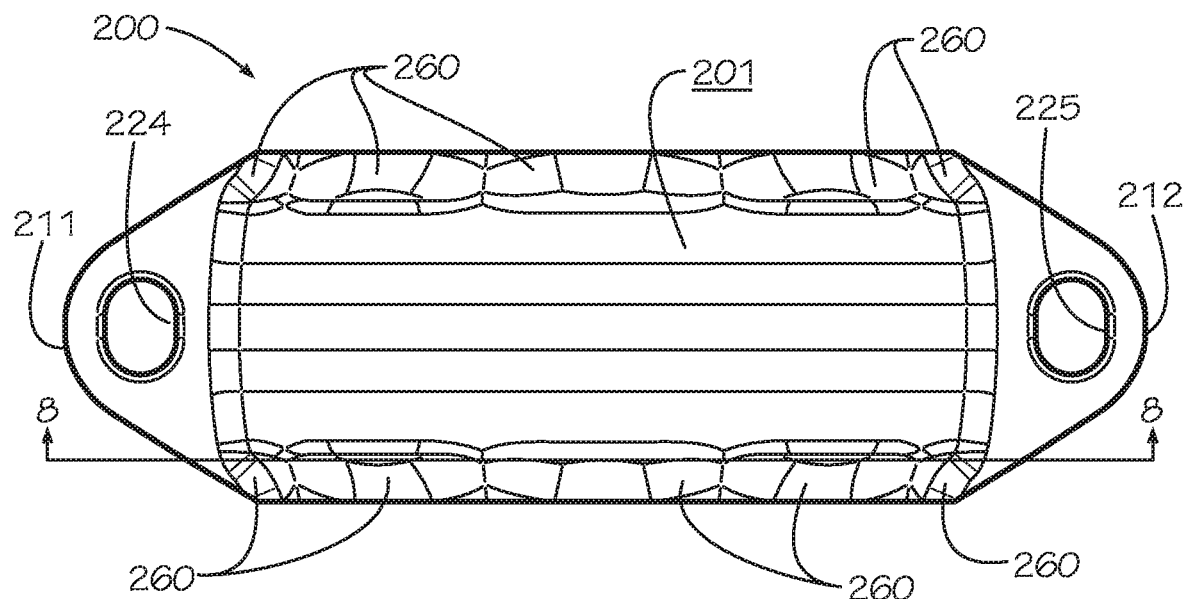
FIG. 6 is a top view of the coupling segment of FIG. 4.
Figure 7:
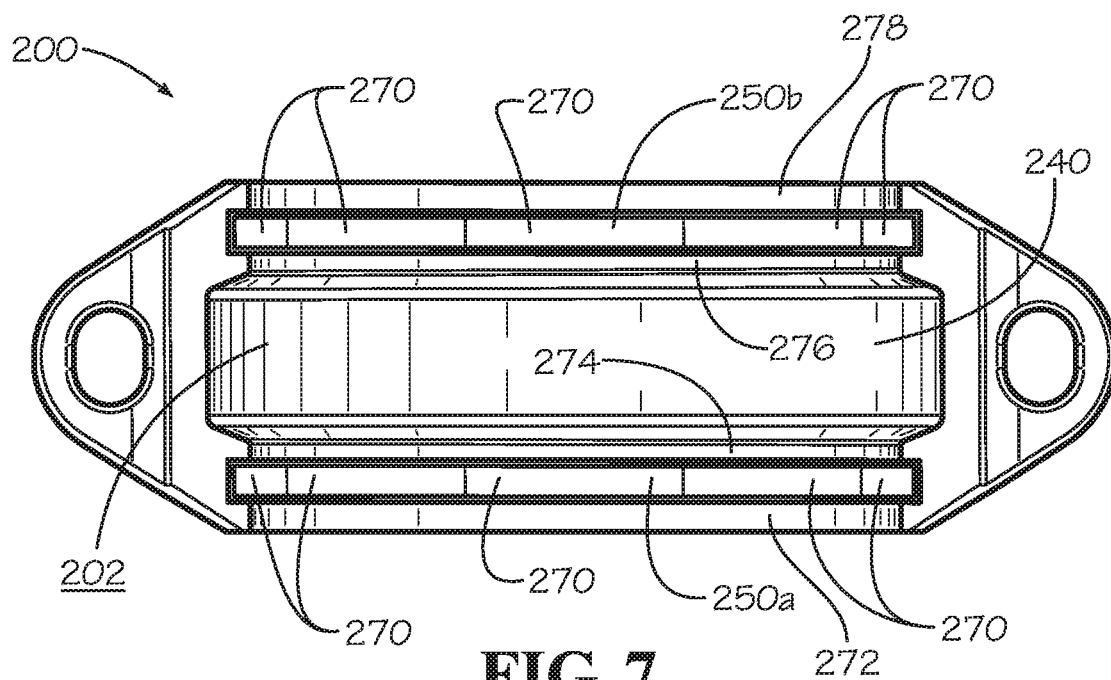
FIG. 7 is a bottom view of the coupling segment of FIG. 4.
Figure 8:
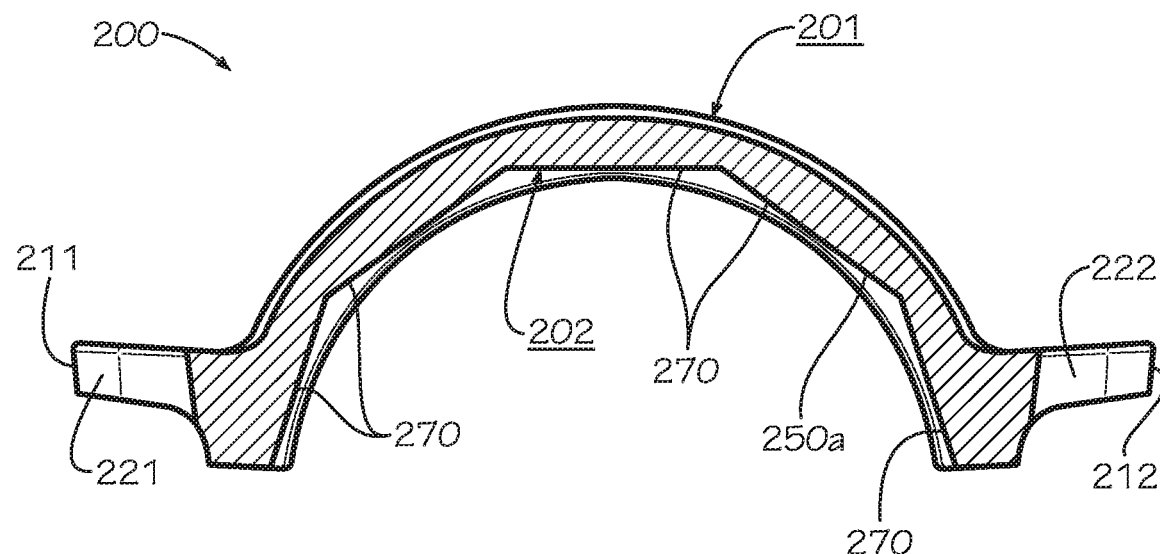
FIG. 8 is a sectional view of the coupling segment of FIG. 4 taken along line 8-8 of FIG. 6.
Figure 9:
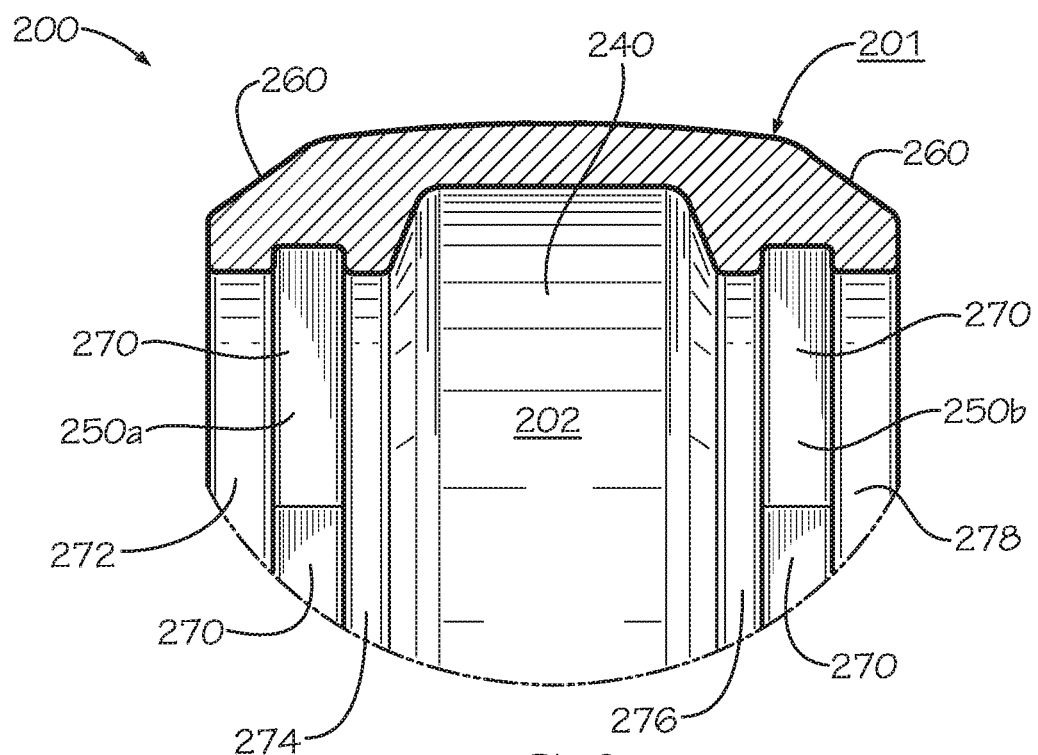
FIG. 9 is a sectional view of the coupling segment of FIG. 4 taken along line 9-9 of FIG. 5.

In various aspects and as shown in FIGS. 4-9, the coupling segment 200 respectively defines fastener openings 224,225 in fastener pads 221,222 proximate to the first end 211 and the second end 212. In one aspect, the fasteners opening 224,225 may be capsule-shaped and extend in an axial direction defined by the pipe coupling 100, though the fastener openings may have various other shapes in other aspects, including a circular or rectangular shape, and can extend in a direction orthogonal to the axial direction or other directions as required for particular applications. In one aspect, to facilitate the manufacture of the coupling segment 200, an inner surface of the fastener openings 224,225 are drafted as shown in FIG. 5 and other surfaces shown in FIGS. 4-9 of the coupling segment 200 are drafted as shown. In one aspect, each of the fastener pads 221,222 tapers toward the first end 211 and the second end 212 as shown in FIGS. 6 and 7. In one aspect, the gasket groove 240 is centered axially in the coupling segment 200. In one aspect, each of the ring grooves 250*a,b* is positioned axially outward from the gasket groove 240 as shown in FIGS. 7 and 9. In one aspect, the groove bottom segments 270—which can also be described as flat portions of a groove bottom surface defined in the inner surface 202 of the coupling segment 200—of the ring grooves 250*a,b* are each flat in cross-section as shown in FIG. 8. In one aspect, the groove bottom segments 270 of the ring grooves 250*a,b* are flat in cross-section and parallel to an axial direction of the coupling segment in cross-section as shown in FIG. 9. In one aspect, the groove bottom segments 270 form a substantially half-polygonal shape in a radially oriented plane. In one aspect where a pair of coupling segments 200 is assembled in a pipe coupling 100, the groove bottom segments 270 of both coupling segments 200 form a ten-sided polygonal profile. In another aspect, the total number of groove bottom segments 270 can be greater than or less than ten.

In one aspect, when the coupling segments 200*a,b* are formed with the groove bottom segments 270, an outer surface 304 (shown in FIG. 10A) of the substantially circular pipe connection rings 300*a,b* can be configured to contact only a portion of the ring grooves 250*a,b*. For example and without limitation, the outer surface 304 of each of the pipe connection rings 300*a,b* can be configured to contact a portion of the ring grooves 250*a,b* of each of the coupling segments 200*a,b* only at respective midpoints of the coupling segments 200*a,b* between the respective first end 211*a,b* and the second end 212*a,b*. In one aspect, the groove bottom segments 270 enable portions of an outer surface 304 of the pipe connection ring 300 to slide more easily during tightening of the pipe coupling 100 while the pipe connection ring 300 compresses due to the shape and orientation of the groove bottom segments 270 and the reduced contact surface area between the outer surface 304 of the pipe connection ring 300 and the groove bottom segments 270. The ring grooves 250*a,b* may also have a radiused profile instead of the polygonal profile shown.

In various aspects and as shown in FIGS. 10A-14D, the pipe connection ring 300 comprises a plurality of segments and a plurality of links that are deformable with respect to the segments. In various aspects, each of the plurality of links connects a one of the plurality of segments to another of the plurality of segments. In various aspects, the segments and the links alternate about the circumference of the pipe connection ring 300. In one aspect, the pipe connection ring 300 is a closed ring, wherein to be a "closed ring" means to have a ring without ends or to have a ring where the two ends are joined or connected to one another. If a ring has two ends that are "joined" or "connected," however, the two ends cannot be simply touching each other such that the ring could be made to open up a gap such as in the case of a split ring.

Figures 10A, 10B:
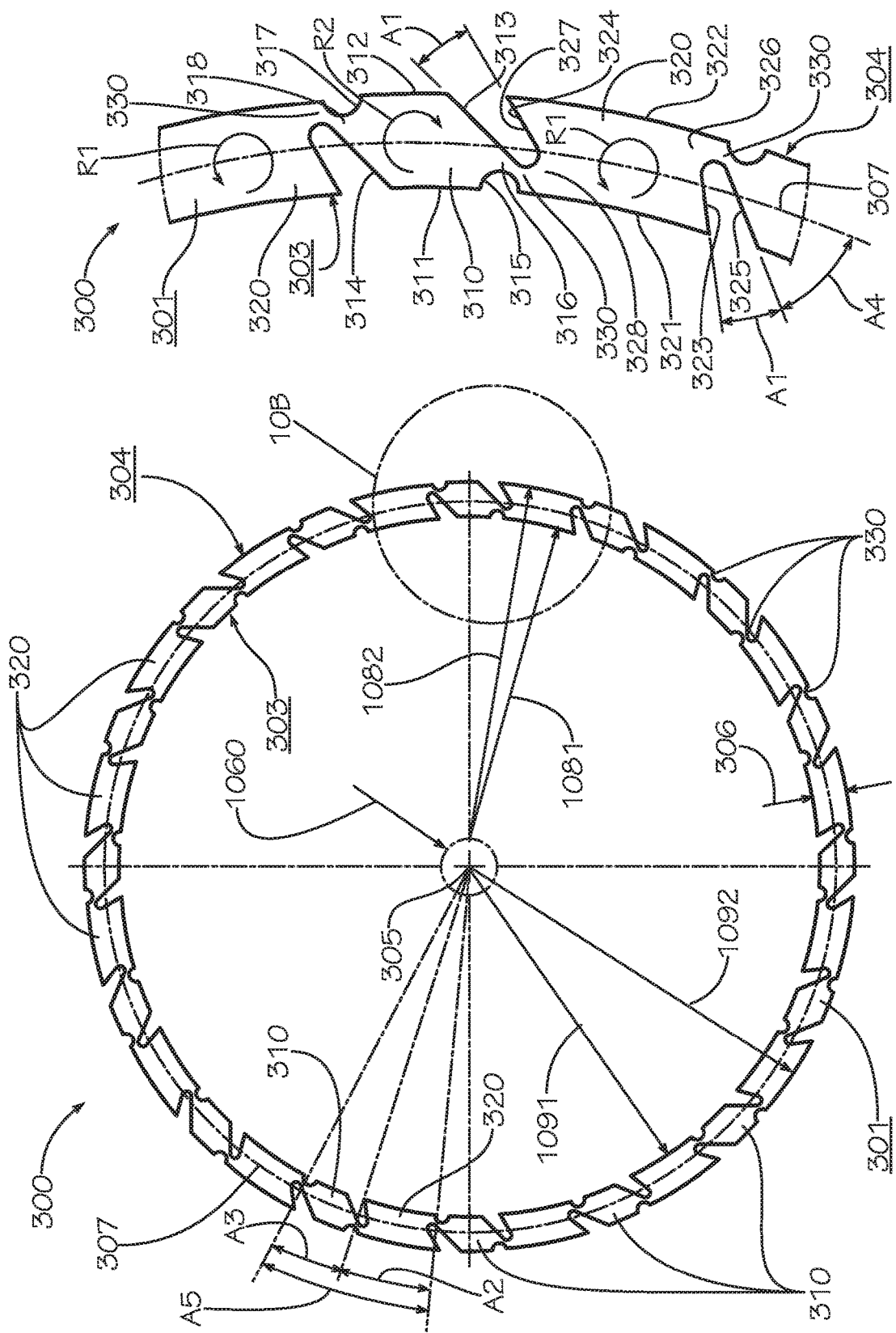
FIG. 10A is a front view of a pipe connection ring in accordance with one aspect of the current disclosure.
FIG. 10B is a detail view of the pipe connection ring of FIG. 10A taken from detail 10B of FIG. 10A.

In one aspect and as shown in FIGS. 10A and 10B, the pipe connection ring 300 comprises a plurality of alternating segments 310 and segments 320, connected to each other by a plurality of links 330 positioned therebetween. In one aspect, each segment 310 comprises an inner side 311, an outer side 312, a first end 313, and a second end 314 and defines a relief 315 in the inner side 311 proximate to a first linking end 316 of the segment 310 and a relief 317 in the outer side 312 proximate to a second linking end 318 of the segment 310. In one aspect, the segment 320 comprises an inner side 321, an outer side 322, a first end 323, and a second end 324. In one aspect, the segment 310 and the segment 320 together define a relief 325 proximate to a first linking end 326 of the segment 320 and a relief 327 proximate to a second linking end 328 of the segment 320. In one aspect, each of the reliefs 315,317 comprises, for example and without limitation, a semicircular shape that helps define the shape of the link 330 such that the link 330 can have a cross-sectional area that is smaller than a cross-sectional area of the segment 310 or the segments 320 and will therefore deform first and also deform predictably—specifically, at the point where the cross-sectional area of the link 330 is at a minimum. The reliefs 315,317 may include a V-shaped portion. In one aspect, each of the reliefs 325,327 comprises opposing sides that are angled with respect to one another by a relief angle A1. In various aspects, deformation of the pipe connection ring 300 can cause the relief angle A1 of the reliefs 325,327 to decrease from its original value or can otherwise cause the shape of the reliefs 315,317,325,327 to be altered. In various aspects, each of the first ends 313,323 and the second ends 314,324 are angled by a slant angle A4 with respect to a tangent line defined by a circumferential axis 307 of the pipe connection ring 300. In one aspect, the pipe connection ring 300 defines a first axial end surface 301, a second axial end surface distal from the first axial end surface 301, an inner surface 303, and the outer surface 304.

In one aspect, the link 330 between each pair of adjacent segments such as between any two adjacent segments 310, 320 is a small portion of material connecting the first segment 310 to the second segment 320 and is deformable with respect to the segments 310,320 to allow the pipe connection ring 300 to be compressed in a radial direction. In one aspect, by being weaker than the segments 310,320, the link 330 results in predictable and constant compression of the pipe connection ring 300 in a radial direction at each point around the pipe connection ring 300. In one aspect, the plurality of segments defines a local inner radius 1081 and a local outer radius 1082 centered about a point that is offset by an offset distance 1060 from a central axis 305 of the pipe connection ring 300. In one aspect, adjacent links 330 are positioned at regular intervals around the circumference of the pipe connection ring 300. In one aspect, the adjacent links 330 connected to the linking ends 326,328 of the segment 320 are spaced apart as shown by a spacing angle A2 and the adjacent links 330 connected to the linking ends 316,318 of the segment 310 are spaced apart as shown by a spacing angle A3. In one aspect, the spacing angle A5 represented by the sum of the spacing angle A2 and the spacing angle A3 is equal to, for example and without limitation, approximately 22.5 degrees due to the existence of sixteen segment pairs, each segment pair containing a segment 310 and a segment 320.

The pipe connection ring 300 shown in FIGS. 10A and 10B and other exemplary pipe connection rings 300 such as those shown in FIGS. 11A-14D can be formed from a flat blank of raw material such as, for example and without limitation, carbon steel and stainless steel including spring steel grades of each. The pipe connection ring 300 shown can be formed using one or more material removal processes such as, for example and without limitation, machining, stamping, punching, laser-cutting, abrasive-water-jet-cutting, and chemical milling or etching, optionally in combination with forming processes such as, for example and without limitation, casting, forging, stamping, bending, and three-dimensional printing. Likewise, in one aspect, the plurality of segments 310,320 and the plurality of links 330 define an axial ring thickness 308 (i.e., a thickness of the pipe connection ring 300 in an axial direction) shown in FIG. 13B that is constant between the pipe connection ring 300 as shown and the pipe connection ring 300 as compressed in a radial direction (i.e., when the pipe coupling 100 is in an assembled and tightened state). The axial ring thickness 308, however, need not be constant in every embodiment of the pipe connection ring 300.

During installation of the pipe coupling 100, the pipe connection ring 300 can be compressed in a radial direction towards the central axis 305 by gradual tightening of the pipe coupling 100 with the pipe connection ring 300 inside a ring groove 250 of the pipe coupling 100. During radial compression of the pipe connection ring 300, the center of the local inner radius 1081 and the local outer radius 1082 of the respective datum surfaces of each segment 310,320 of the pipe connection ring 300 approaches the central axis 305 until the center of each of the radii 1081,1082 is coaxial with the central axis 305. In one aspect, during radial compression of the pipe connection ring 300 or between a non-assembled state and an assembled and tightened state of the pipe coupling 100, each of the plurality of segments 310,320 rotates in one of a direction R1 and a direction R2 with respect to a circumferential axis 307 of the pipe connection ring 300. In one aspect, it is the alternating placement of the links 330 on the inside and outside of the pipe connection ring 300 that causes this rotation. This rotation may be difficult to measure absent fine measuring techniques because of the relatively small size of the offset distance 1060 relative to the radii 1081,1082 and an overall inner radius 1091 and an overall outer radius 1092 as measured from the central axis 305. In one aspect, each of the plurality of segments 310 rotates with respect to a circumferential axis 307 of the pipe connection ring 300 between a non-assembled state and an assembled and tightened state. The local inner radius 1081 may be made to match the overall inner radius 1091, however, and the local outer radius 1082 may be made to match the overall outer radius 1092.

In another aspect and as shown in FIGS. 11A and 11B, the pipe connection ring 300 comprises the plurality of segments 310 and the plurality of links 330 positioned therebetween; however, each of the plurality of segments 310 and the plurality of links 330 are of a different shape than previously described. In one aspect, each segment 310 comprises the inner side 311, the outer side 312, the first end 313, and the second end 314 and defines a relief 315 in the first end 313 proximate to the first linking end 316 and an relief 317 in the second end 314 proximate to the second linking end 318.

In one aspect, the link 330 between each pair of adjacent segments 310 is a small portion of material connecting one segment 310 to an adjacent segment 320 and is deformable with respect to the adjacent segments 310 to allow the pipe connection ring 300 to be compressed in a radial direction. The link 330 comprises legs 1110a,b and a hairpin bend 1120. In one aspect, the leg 1110a is connected to the second linking end 318 of one segment 310 and the leg 1110b is connected to the first linking end 316 of an adjacent segment 310. In one aspect, the legs 1110a,b comprise opposing sides that are angled with respect to one another by the relief angle A1. In various aspects, deformation of the pipe connection ring 300 can cause the relief angle A1 of the reliefs 325,327 to decrease from its original value or can otherwise cause the shape of the reliefs 315,317,325,327 to be altered. In one aspect, by being weaker than the segments 310, the link 330 results in predictable and constant compression of the pipe connection ring 300 in a radial direction at each point around the pipe connection ring 300. In one aspect, the plurality of segments defines the local inner radius 1081 and the local outer radius 1082 centered about a point that is offset by the offset distance 1060 from the central axis 305 of the pipe connection ring 300. In one aspect, the plurality of segments 310 and the plurality of links 330 define a radial ring thickness 306 that is constant between a non-assembled state and an assembled and tightened state.

In one aspect, adjacent links 330 are positioned at regular intervals and spaced, for example and without limitation, approximately twenty degrees apart as shown by the spacing angle A2. In one aspect, the pipe connection ring 300 thus comprises eighteen different segments 310. In one aspect, each of the plurality of segments 310 remains aligned with (i.e., does not rotate with respect to) a circumferential axis 307 of the pipe connection ring 300 between a non-assembled state and an assembled and tightened state. In one aspect, the pipe connection ring 300 is in an uncompressed condition when the pipe coupling 100 is in an untightened position, and the pipe connection ring 300 is in a compressed condition when the pipe coupling 100 is in a tightened position.

Figure 12C:
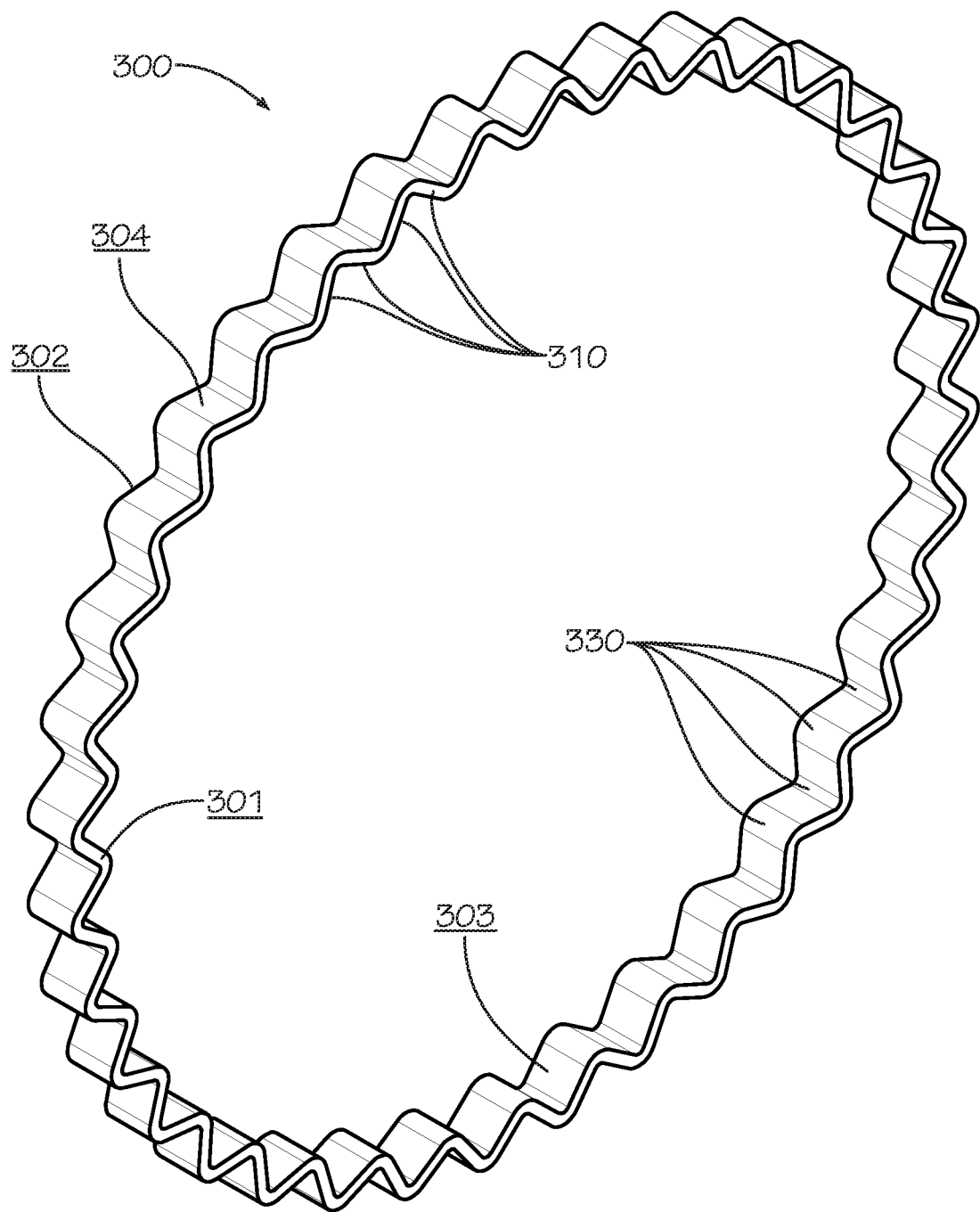
FIG. 12C is a perspective view of the pipe connection ring of FIG. 12A.
Figure 13A:
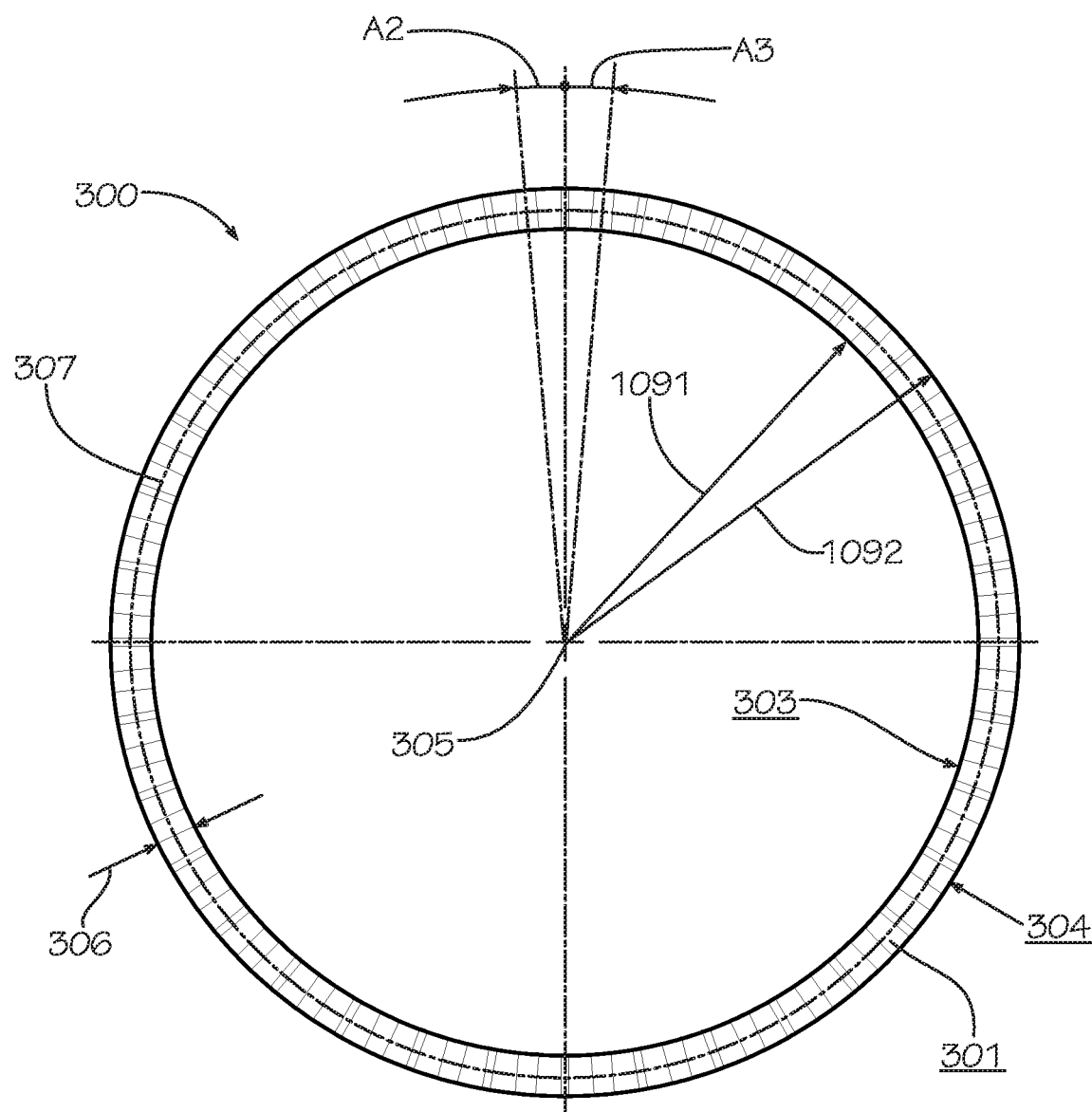
FIG. 13A is a front view of a pipe connection ring in accordance with another aspect of the current disclosure.
Figure 13B:
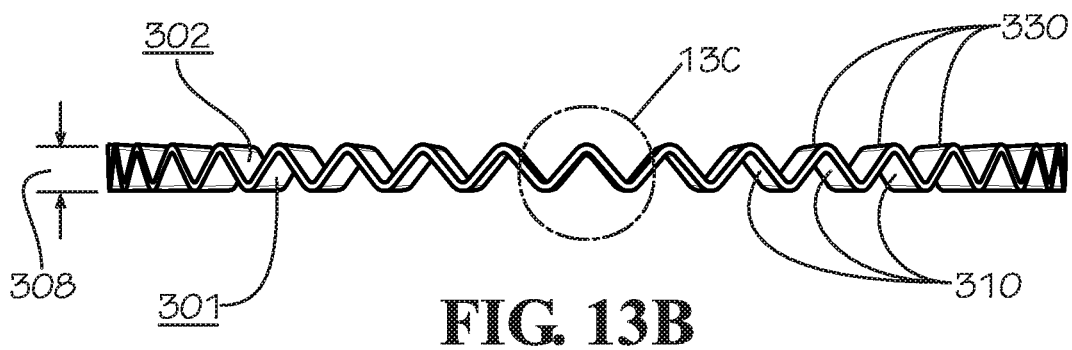
FIG. 13B is a top view of the pipe connection ring of FIG. 13A.
Figure 13C:
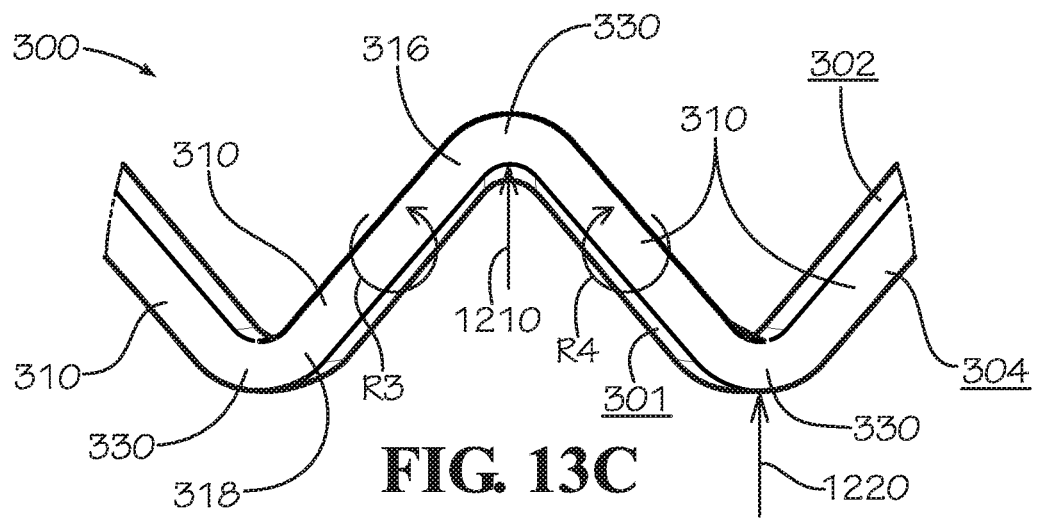
FIG. 13C is a detail view of the pipe connection ring of FIG. 13A taken from detail 13C of FIG. 13B.
Figure 13D:
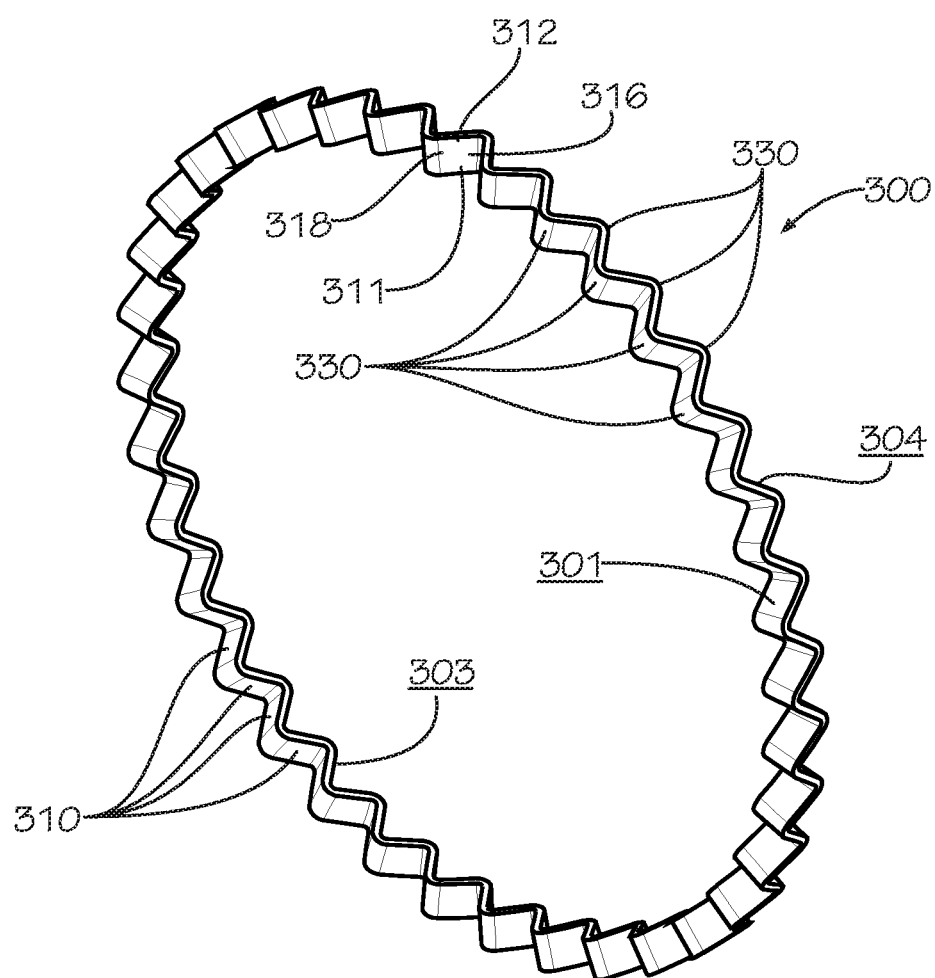
FIG. 13D is a perspective view of the pipe connection ring of FIG. 13A.
Figure 14A:
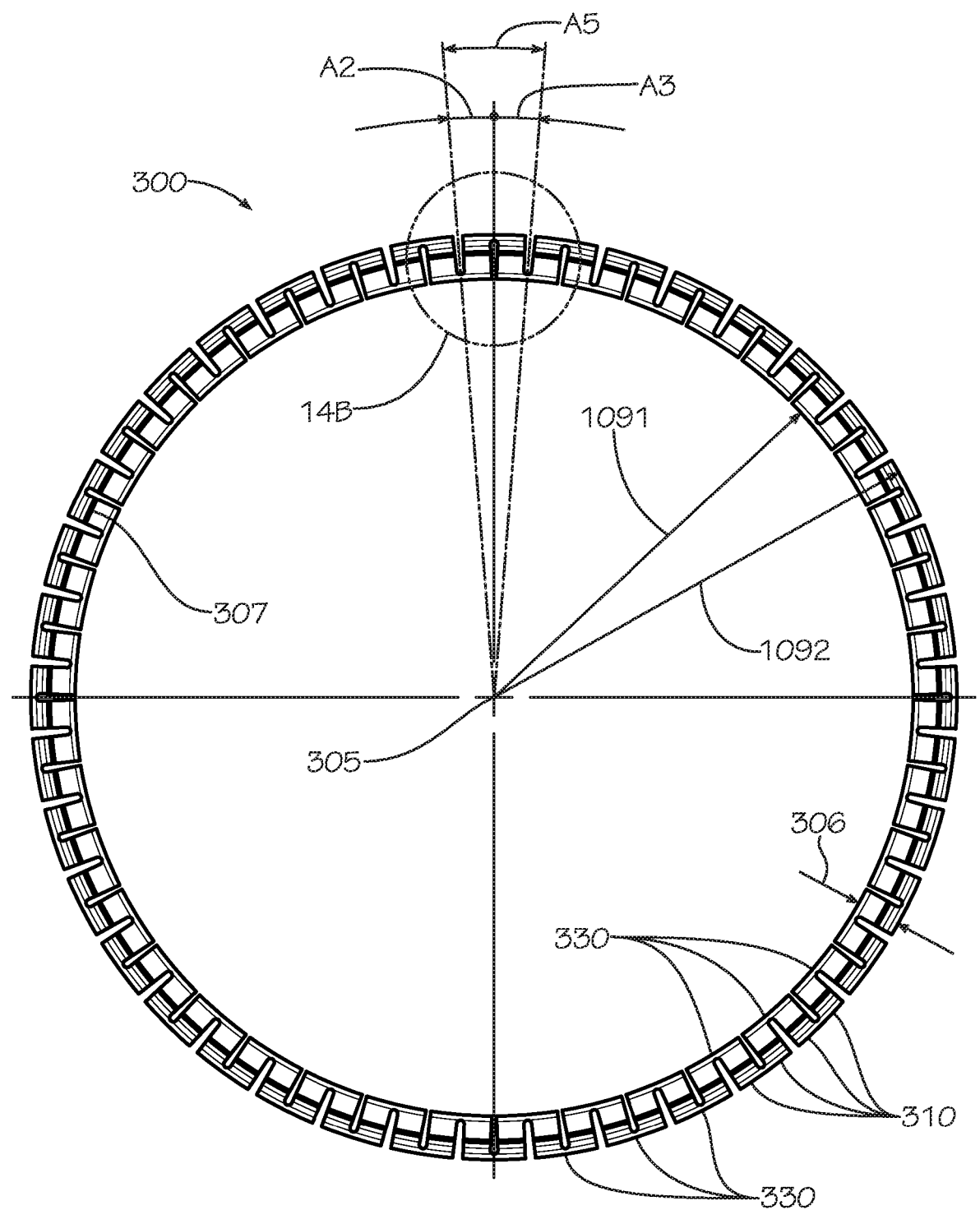
FIG. 14A is a front view of a pipe connection ring in accordance with another aspect of the current disclosure.

In another aspect and as shown in FIGS. 12A through 12C, the pipe connection ring 300 comprises the plurality of segments 310 and the plurality of links 330 positioned therebetween; however, each of the plurality of segments 310 and the plurality of links 330 are of a different shape than previously described. In one aspect, the segment 310 has the shape of a bar of constant thickness aligned along an axial direction, the segment 310 including the inner side 311, the outer side 312, the first linking end 316, and the second linking end 318. As shown in FIGS. 12A through 12C, the plurality of segments 310 and the plurality of links 330 defines an undulating or wave-like shape that undulates between the overall inner radius 1091 and the overall outer radius 1092. As shown, the links 330 are bends in the material. In one aspect, an internal radius 1210 of an axially aligned edge of the pipe connection ring 300 is sized such that compression in a radial direction of the pipe connection ring 300 can cause deformation primarily at the link 330 due to the increased stress concentration in the pipe connection ring 300 at each of the links 330 due to the small size of the internal radius 1210. In one aspect, an external radius 1220 of an axially aligned edge of the pipe connection ring 300 is, for example and without limitation, greater than the internal radius 1210 by an amount equal to a thickness of the material forming the pipe connection ring 300, which in one aspect is equal to a distance from the inner side 311 to the outer side 312 of the segment 310. The external radius 1220 could also be greater than the internal radius 1210 by an amount greater than a nominal thickness of the material forming the pipe connection ring 300, causing an effective thickness of the link 330 to decrease. Reducing the effective thickness of the link 330 relative to the thickness of the segment 310 causes the link 330 to deform more easily and still have the rigidity provided by the segments 310. In one aspect, the plurality of segments 310 and the plurality of links 330 define a radial ring thickness 306 that increases between a non-assembled state and an assembled and tightened state.

In one aspect, adjacent links 330 are spaced, for example and without limitation, approximately five degrees apart as shown by each of the spacing angles A2,A3. In one aspect, the pipe connection ring 300 thus comprises thirty-six different segments 310. In one aspect, each of the plurality of segments 310 is inclined with respect to and continues to rotate in one of the direction R1 and the direction R2 with respect to a circumferential axis 307 of the pipe connection ring 300 between a non-assembled state and an assembled and tightened state. In one aspect, the plurality of segments 310 and the plurality of links 330 define undulations in the radially outward facing outer surface 304 of the pipe connection ring 300.

In another aspect and as shown in FIGS. 13A through 13D, the pipe connection ring 300 comprises the plurality of segments 310 (shown in FIG. 13B) and the plurality of links 330 (also shown in FIG. 13B) positioned therebetween; however, each of the plurality of segments 310 and the plurality of links 330 are of a different shape than previously described. In one aspect, the segment 310 has the shape of a bar of constant thickness aligned in a radial direction, the segment 310 including the inner side 311 (shown in FIG. 13D), the outer side 312 (also shown in FIG. 13D), the first linking end 316 (shown in FIG. 13C), and the second linking end 318 (also shown in FIG. 13C). As shown in FIGS. 13A through 13D, the plurality of segments 310 and the plurality of links 330 defines an undulating or wave-like shape that undulates between an axially outermost portion of the first axial end surface 301 and an axially outermost portion of the second axial end surface 302. As shown, the links 330 are bends in the material. In one aspect, the internal radius 1210 (shown in FIG. 13C) of a radially aligned edge of the pipe connection ring 300 is sized such that compression in a radial direction of the pipe connection ring 300 can cause deformation at the link 330 due to the increased stress concentration in the pipe connection ring 300 at each of the links 330 due to the small size of the internal radius 1210. In another aspect, the segments 310 can also deform during radial compression of the pipe connection ring 300. In one aspect, the external radius 1220 of a radially aligned edge of the pipe connection ring 300 is, for example and without limitation, greater than the internal radius 1210 by an amount equal to a thickness of the material forming the pipe connection ring 300, which in one aspect is equal to a distance from the first axial end surface 301 to the second axial end surface 302 of the segment 310.

In one aspect, adjacent links 330 are spaced, for example and without limitation, approximately five degrees apart as shown by each of the spacing angles A2,A3. In one aspect, the pipe connection ring 300 thus comprises thirty-six different segments 310. In one aspect, each of the plurality of segments 310 is inclined with respect to and continues to rotate in one of the direction R3 and the direction R4 with respect to a diameter of the pipe connection ring 300 between a non-assembled state and an assembled and tightened state. In one aspect, the plurality of segments 310 and the plurality of links 330 define an axial ring thickness 308 that increases from a non-assembled state to an assembled and tightened state. In one aspect, an increase in the axial ring thickness 308 during radial compression of the pipe connection ring 300 can promote more constant deformation of the pipe connection ring 300 about its circumference. For example and without limitation, any portion of the pipe connection ring 300 which tends to deform more quickly during radial compression can approach or contact the sides of the ring groove 250. If the pipe connection ring 300 contacts the ring groove 250, deformation can slow or stop until other portions of the pipe connection ring 300 deform to an equal degree or until compression of the pipe connection ring 300 stops due to the pipe connection ring 300 engaging the pipe element 110,120. In one aspect, the plurality of segments 310 and the plurality of links 330 define undulations in the axially outward facing axial end surfaces 301,302 of the pipe connection ring 300.

In another aspect and as shown in FIGS. 14A through 14D, the pipe connection ring 300 comprises the plurality of segments 310 and the plurality of links 330 positioned therebetween; however, each of the plurality of segments 310 and the plurality of links 330 are of a different shape than previously described.

In one aspect as shown in FIG. 14C, the segment 310 has the cross-sectional shape of a beam in the shape of a letter "S" of constant thickness aligned substantially along a circumferential axis 307, the cross-sectional shape of the segment 310 including an inner leg 1411, an outer leg 1412, a first end leg 1413 extending from the inner leg 1411, a second end leg 1414 extending from the outer leg 1412, and a cross leg 1415 extending diagonally between the inner leg 1411 and the outer leg 1412. In another aspect shown in FIG. 14D, the first end leg 1413 comprises a portion that is angled from the first axial end surface 301 and the second end leg 1414 comprises a portion that is angled from the second axial end surface 302 by a bend angle A7.

As shown in FIGS. 14A through 14D, the plurality of segments 310 and the plurality of links 330 defines an undulating or square wave-like shape that undulates between the overall inner radius 1091 and the overall outer radius 1092. In one aspect, compression of the pipe connection ring 300 in a radial direction will cause deformation primarily at the link 330 because the cross-sectional area of the pipe connection ring 300 is at a minimum at each of the links 330. Each of the plurality of links 330 may be positioned alternately proximate to an inner diameter and proximate to an outer diameter of the pipe connection ring 300.

In one aspect, adjacent links 330 are spaced, for example and without limitation, approximately 4.5 degrees apart as shown by each of the spacing angles A2,A3. In one aspect, the pipe connection ring 300 thus comprises forty different segments 310. In one aspect, each of the plurality of segments 310 is inclined with respect to and continues to rotate in one of the direction R1 and the direction R2—or in a direction opposite of the direction R1 or the direction R2—with respect to a circumferential axis 307 of the pipe connection ring 300 between a non-assembled state and an assembled and tightened state. The alternating placement of the links 330 on the inside and outside of the pipe connection ring 300 causes this rotation. In one aspect, the pipe connection ring 300 is allowed to not only compress radially such than the overall inner radius 1091 and the overall outer radius 1092 are decreased, but the pipe connection ring 300 is also allowed to compress radially such that an overall outer radius 1092 will decrease more than an overall inner radius 1091. In various aspects, because of the existence of clearance gaps 1420a,b, a cross-section of the pipe connection ring such as shown in FIG. 14C or 14D can be "crushed" such that the radial ring thickness 306 of the pipe connection ring decreases. In various aspects, a cross-sectional geometry of the pipe connection ring 300 can be modified to increase or decrease the tendency of the pipe connection ring to "crush" by making modifications that increase or decrease the moment of inertia of the cross-sectional geometry. In FIGS. 10A through 14D, each pipe connection ring 300 is shown in an uncompressed state. In a compressed state, each pipe connection ring 300 will have a similar shape but will have a smaller diameter due to the plurality of segments 310,320 coming closer to one another.

Figure 15:
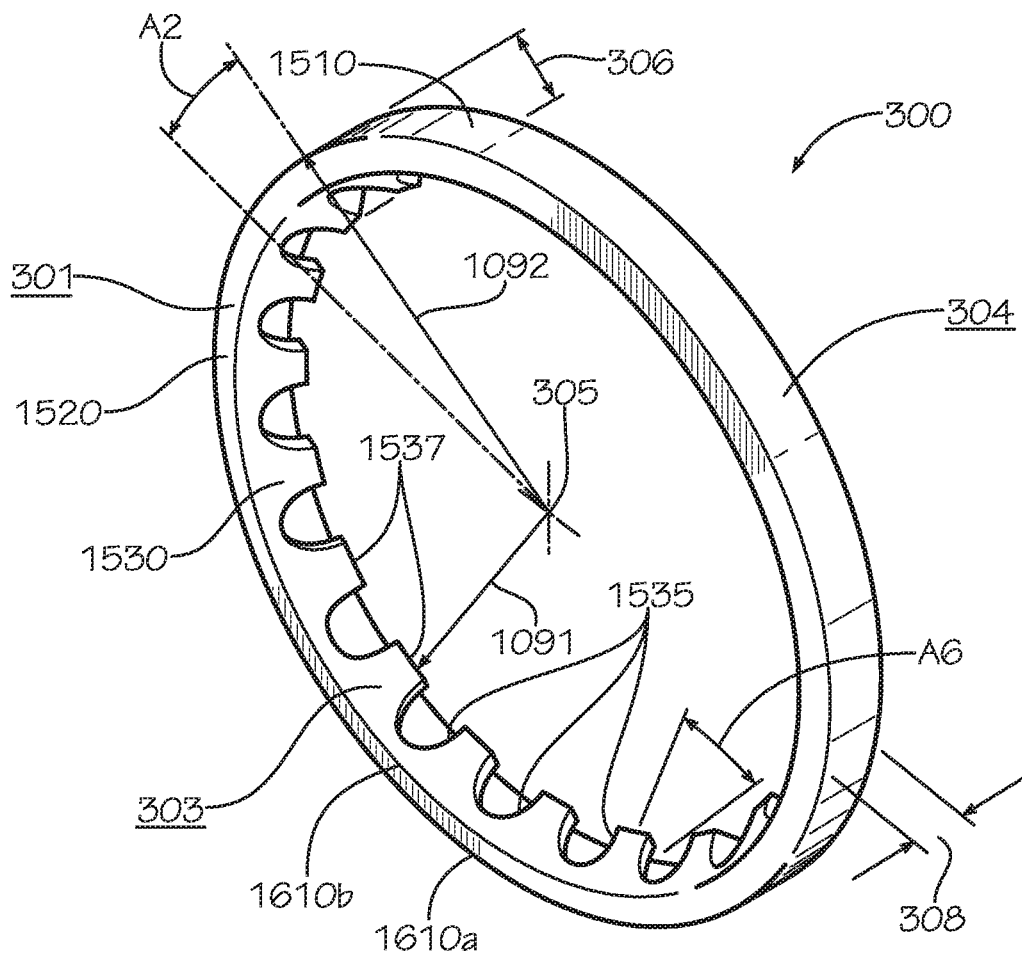
FIG. 15 is a perspective view of a pipe connection ring in accordance with another aspect of the current disclosure.

In another aspect and as shown in FIG. 15, the pipe connection ring 300 comprises new features not previously disclosed and/or eliminates other features. In one aspect shown, the pipe connection ring 300 comprises an outer flange 1510 aligned with an axial direction of the pipe connection ring 300, a radial flange 1520 aligned with a radial direction of the pipe connection ring 300, and an inner flange 1530—which can be serrated as shown—angled with respect to an axial direction of the pipe connection ring 300 by an incline angle A6. In one aspect, each of the segments 310 has a cross-sectional shape that is aligned substantially along a circumferential axis. In one aspect, the inner flange 1530 of the pipe connection ring 300 defines a plurality of relief cuts 1535 and ends 1537.

Figure 16:
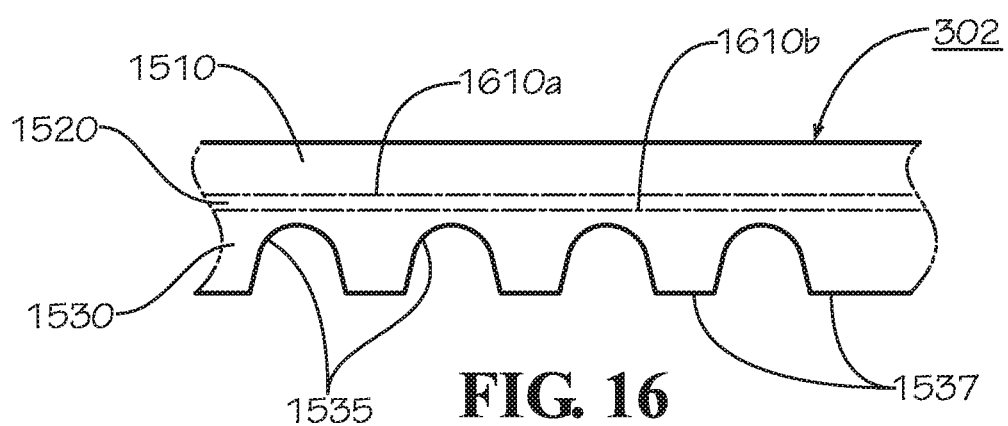
FIG. 16 is a plan view of the pipe connection ring of FIG. 15 in a flattened and unformed condition.
Figure 18:
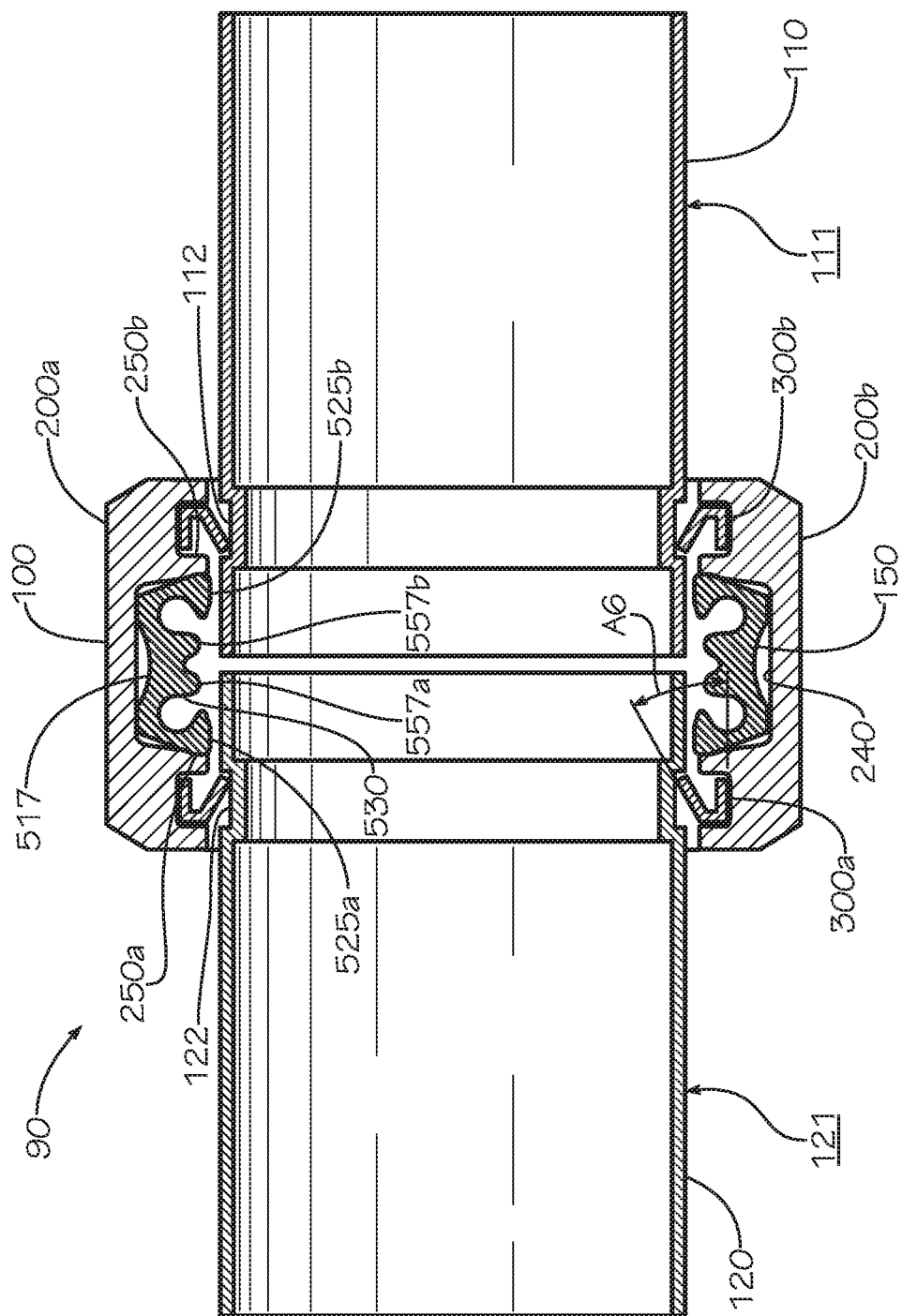
FIG. 18 is a sectional view of the pipe system of FIG. 17 in an assembled condition taken along line 18-18 in FIG. 17.

As shown in FIG. 16, a flattened version of the pipe connection ring 300 before it is formed defines a pair of bend lines 1610a,b, where the bend line 1610a is positioned between the portion of the pipe connection ring 300 forming the outer flange 1510 and the bend line 1610b is positioned between the portion of the pipe connection ring 300 forming the radial flange 1520 and the portion of the pipe connection ring 300 forming the inner flange 1530. In one aspect, radial expansion or bending of an inner flange 1530 in a radially outward direction and the accompanying increase in an overall inner diameter equaling twice the overall inner radius 1091 of the pipe connection ring 300 in a radial direction during the installation of the pipe coupling 100 will allow the pipe connection ring 300 to slide over the pipe elements 110,120 and then return to an unexpanded condition as shown in FIG. 18. Such a pipe connection ring 300 need not be compressed radially to function as intended in the pipe coupling 100 shown.

In one aspect, relief cuts 1535 are spaced, for example and without limitation, approximately 18 degrees apart as shown by the spacing angle A2. In one aspect, the pipe connection ring 300 thus comprises twenty different relief cuts 1535.

In one aspect, as shown in FIGS. 17 and 18, an exemplary pipe system 90 comprises the pipe coupling 100, a first pipe element 110, and a second pipe element 120. The pipe coupling 100 comprises an upper housing represented by the coupling segment 200a, a lower housing represented by the coupling segment 200b, and the gasket 150. The coupling segment 200a and the coupling segment 200b are held together by nuts and bolts or other fasteners (not shown). In one aspect, the pipe coupling 100 can comprise pipe connection rings 300a,b sized to fit within respective connection grooves 112,122 defined in the first pipe element 110 and the second pipe element 120 proximate to ends of the first pipe element 110 and the second pipe element 120. The engagement of the pipe connection rings 300a,b in the connection grooves 112,122 prevents separation of the first pipe element 110 from the second pipe element 120, and the seal created by the gasket 150 against outer surfaces 111,121 of the first pipe element 110 and the second pipe element 120 when the pipe coupling 100 is tightened prevents leakage from the joint between the pipe element 110 and the second pipe element 120.

Figure 19B:
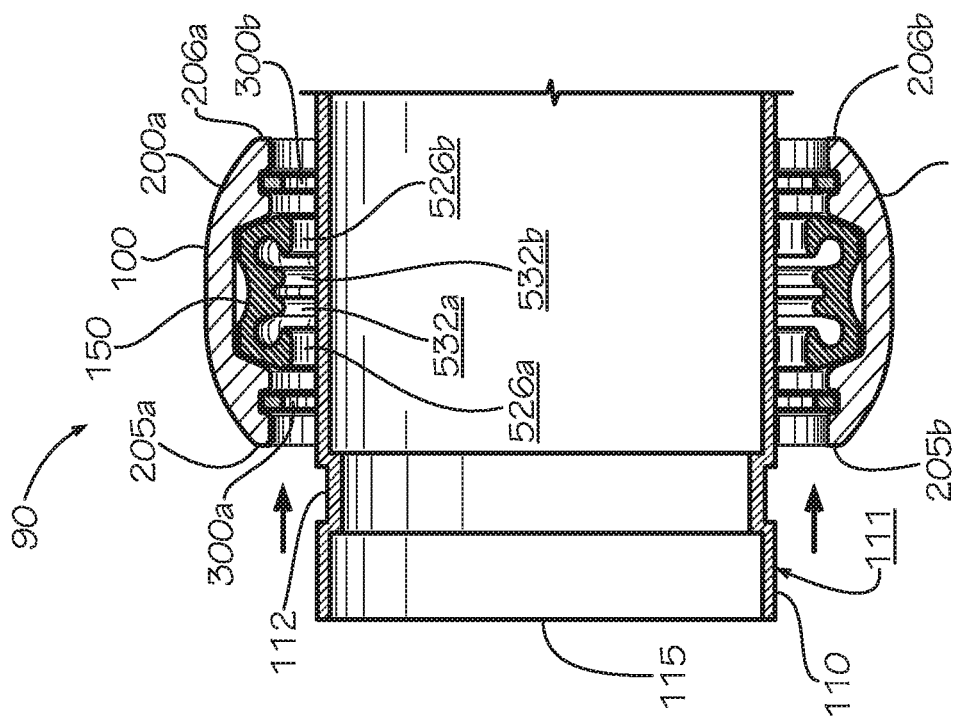
FIG. 19B is a sectional view of the pipe system of FIG. 19A with the pipe coupling slid over an end of the first pipe element.
Figure 19A:
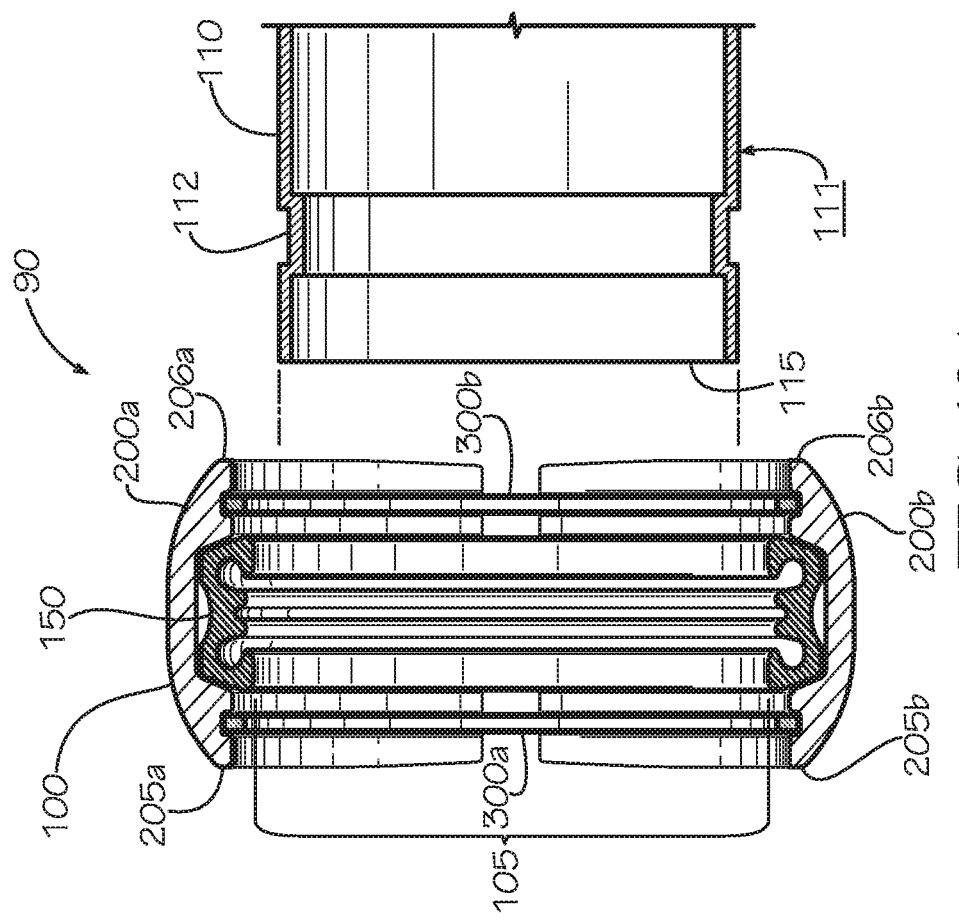
FIG. 19A is a sectional view of a pipe system with the pipe coupling of FIG. 2 shown aligned with a first pipe element in accordance with another aspect of the current disclosure.
Figure 19D:
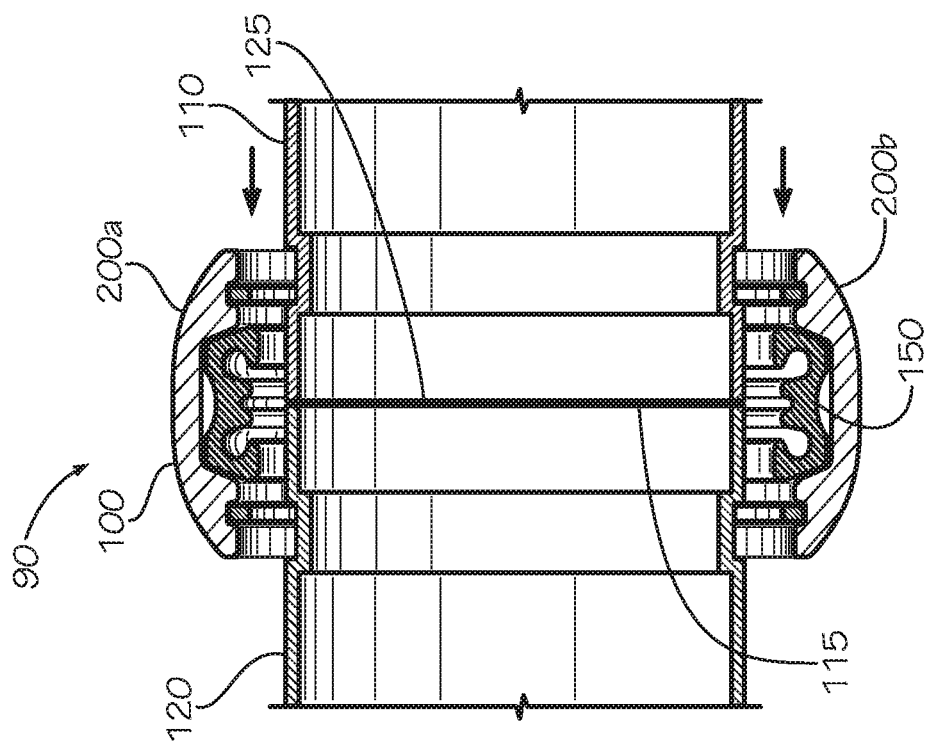
FIG. 19D is a sectional view of the pipe system of FIG. 19A with the pipe coupling slid over and aligned with both of the first pipe element and the second pipe element.
Figure 19C:
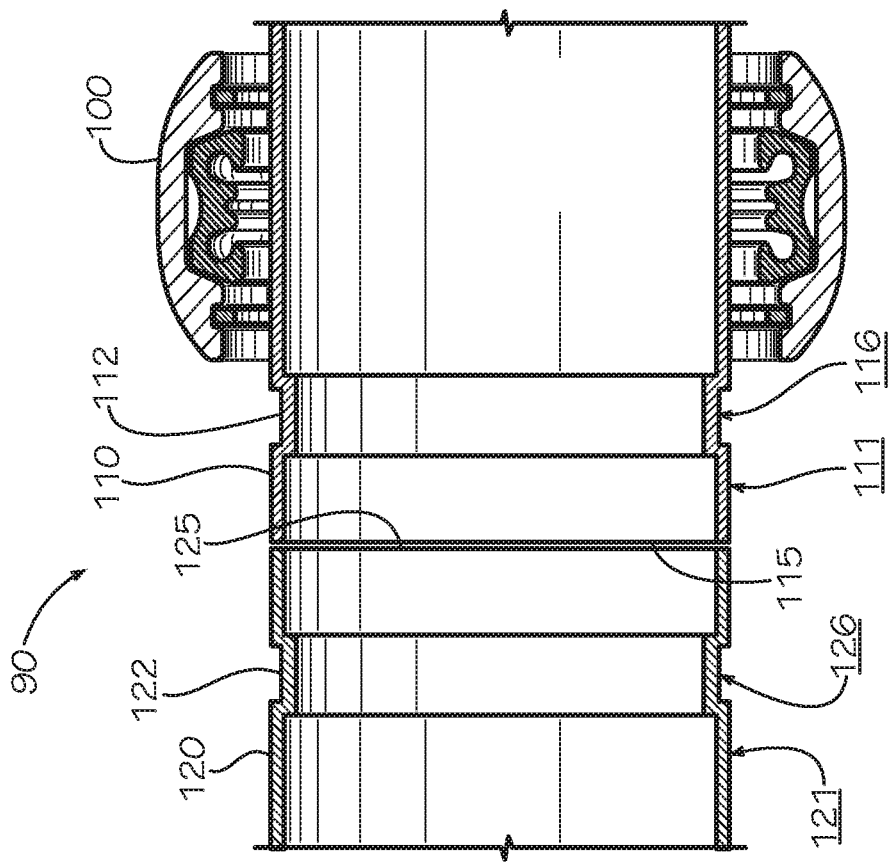
FIG. 19C is a sectional view of the pipe system of FIG. 19A with a second pipe element aligned with the first pipe element.

It may be advantageous for the entire pipe coupling 100 to be able to slide past an end 115 of the pipe element 110 during installation of the pipe coupling 100 as shown in FIGS. 19A-19E. As shown in FIG. 19C, for example, being able to slide the entire pipe coupling 100 past the end 115 of the pipe element 110 during installation may facilitate accurate alignment of the first pipe element 110 with the second pipe element because the pipe coupling 100 need not obscure the joint while still being installed on the first pipe element 110. Being able to slide the entire pipe coupling 100 past the end 115 of the pipe element 110 during installation also permits one to assemble the pipe coupling 100 before installing it on the pipe elements 110,120. Moreover, the pipe elements 110,120 and the pipe coupling 100 can be heavy or difficult to position or align, and it is often easier to assemble the pipe coupling 100 as a separate step before installing the pipe coupling 100 on the pipe elements 110, 120. To facilitate sliding of the entire pipe coupling 100 over the end 115 of the pipe element 110, the pipe connection rings 300a,b and the inner surface 202a,b of the coupling segments 200a,b may have an inner diameter that is greater than an outer diameter of the pipe elements 110,120 when the pipe coupling is in an assembled but untightened state. The gasket 150 may also have an inner diameter that is greater than an outer diameter of the pipe elements 110,120 when the pipe coupling is in an assembled but untightened state, or the gasket 150 may have one or more portions that extend radially inward past an outer surface of the pipe elements 110,120.

FIGS. 19A-19E illustrate the installation of the pipe coupling 100 on the pair of pipe elements 110,120. The pipe coupling 100 is introduced to a pair of pipe elements 110,120 in the preassembled but untightened position of FIG. 2. Each pipe element 110,120 may define a connection groove 112,122 proximate to an end of each pipe element 110,120 for alignment with pipe connection rings 300a,b and to prevent separation of the first pipe element 110 from the second pipe element 120. In the currently described method, the pipe coupling 100 is axially aligned with the end 115 of the first pipe element 110 as shown in FIG. 19A. The pipe coupling 100 is installed by placing the end 115 of the first pipe element 110 in a coupling void 105 defined by the pipe coupling 100 and sliding the pipe coupling 100 over the end 115 of the first pipe element 110 as shown in FIG. 19B. As shown in FIG. 19B, an inner diameter of the gasket is greater than an outer diameter of the first pipe element 110 and the second pipe element 120, resulting in the sealing surfaces 526a,b and the sealing surfaces 532a,b of the gasket 150 being a small distance away from an outer surface 111 of the first pipe element 110. The sealing surfaces 526a,b and 532a,b may contact the outer surface 111 in other aspects. In one aspect, the entire pipe coupling 100 is slid beyond the connection groove 112 of the first pipe element 110 so that the pipe connection rings 300a,b and each of the axial ends 205a,b and 206a,b have passed the connection groove 112 or at least the end 115 of the first pipe element 110. In another aspect, it may not be necessary to slide the entire pipe coupling 100 beyond the connection groove 112 or the end 115. As shown in FIG. 19C, the second pipe element 120 having an end 125 is introduced in end-facing relationship to the end 115 of the first pipe element 110.

As shown in FIG. 19D, when the second pipe element 120 is aligned with the first pipe element 110, the pipe coupling 100 is moved such that the gasket 150 is positioned around the ends 115,125 of the pipe elements 110,120 and the pipe connection rings 300a,b are aligned with the connection grooves 112,122.

Figure 19E:
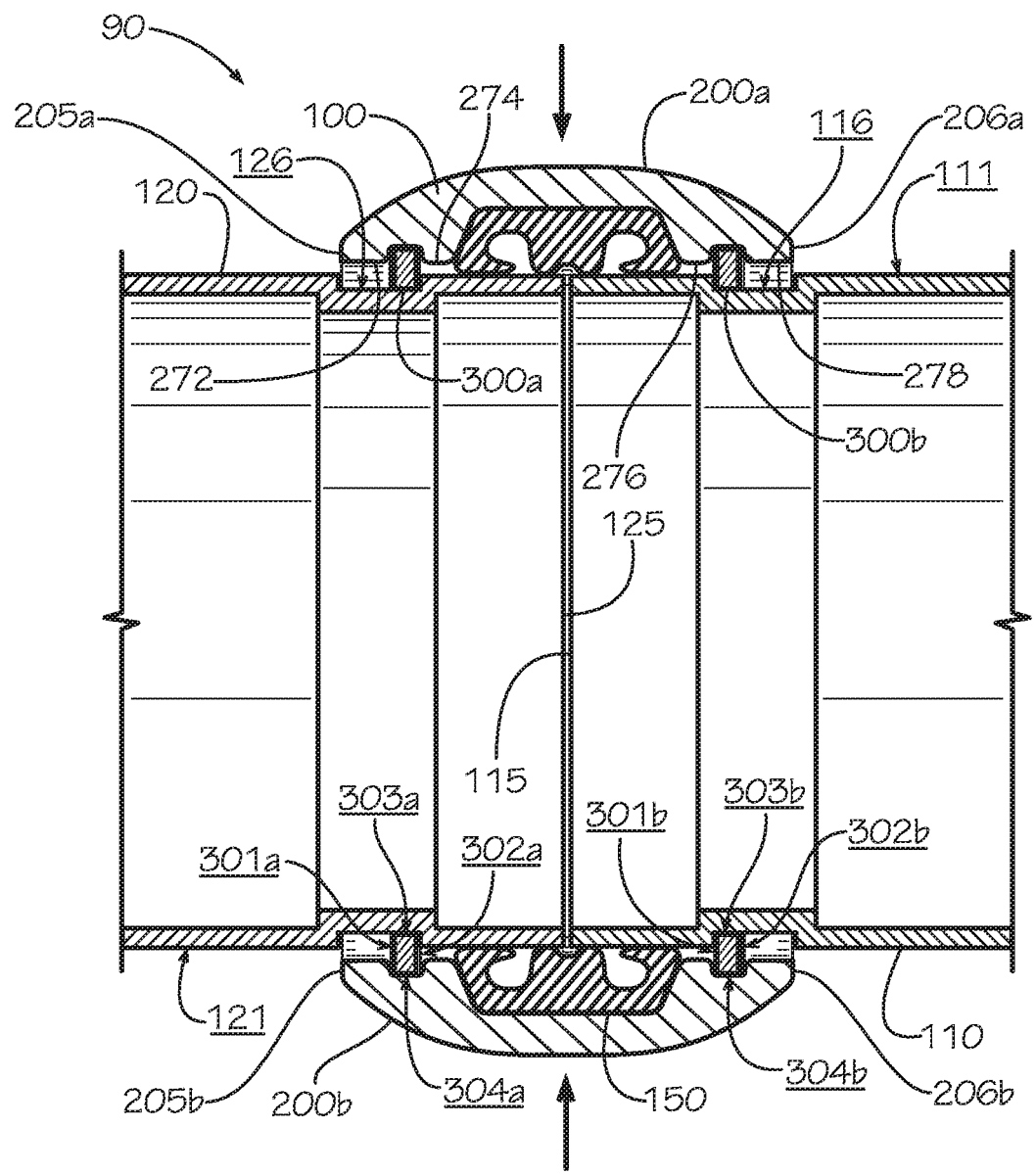
FIG. 19E is a sectional view of the pipe system of FIG. 19A with the pipe coupling tightened around and connecting the first pipe element and the second pipe element.

As shown in FIG. 19E, when the coupling segments 200a,b are clamped down or tightened around the pipe elements 110,120 by tightening the nuts on the bolts or by any other tightening method, the gasket 150 deforms into sealing engagement against the outer surfaces 111,121 of the pipe elements 110,120 and the pipe connection rings 300a,b sit respectively within the connection grooves 112,122. A radially innermost portion of the respective inner surface 303a,b of each of the pipe connection rings 300a,b can contact a radially innermost portion of a connection groove surface 116,126 that defines a groove bottom of the connection grooves 112,122.

When the pipe coupling 100 is a flexible-type pipe coupling, a space or gap may remain between the pipe connection ring 300 and the radially innermost portion of the connection groove surface 116,126. This gap may exist only at specific points or around the full circumference of the pipe connection ring 300. The pipe connection ring 300 can be configured to compress only to a certain point at which an inner diameter of the pipe connection ring 300 is greater than the outer diameter of the radially innermost portion of the connection groove surface 116,126. The gap allows or the gaps allow a limited amount of freedom for the pipe elements 110,120 to move within the pipe coupling 100, which may prove advantageous for some installations including those in earthquake-prone geographic areas. If the pipe connection ring 300 is allowed to compress further, then even complete tightening of the pipe coupling 100 will not cause the pipe connection ring to fully compress. In that event, the pipe coupling segments 200a,b will deform uniformly and leave no gap between the pipe connection ring and the radially innermost portion of the connection groove surface 116,126. This results in a rigid-type pipe coupling, in which the pipe elements 110,120 have no clearance with which to move within the pipe coupling 100, which may prove advantageous for some installations including those in which the fluid inside the pipe elements 110,120 is at high pressure. An example of a rigid-type configuration is illustrated in FIGS. 19A-19E.

An axial end surface such as the first axial end surface 301a,b or the second axial end surface 302a,b of the pipe connection rings 300a,b may contact an axially outermost portion of the connection groove surface 116,126 (i.e., axially outermost meaning closest to the ends 115,125) that defines a sidewall of the connection grooves 112,122. The connection rings 300a,b may not contact the sidewalls of the connection grooves 112,122 in other aspects until an internal or external force, such as fluid pressure with the pipe system 90, acts to separate the pipe elements 110,120, and the connection rings 300a,b thereby engage the sidewalls and groove bottoms to prevent this separation. In some aspects, a gap can remain between the transition portions 272,274, 276,278 of the inner surface 202a,b of each coupling segment 200a,b and a radially outermost portion of the outer surfaces 111,121 of the pipe elements 110,120 upon clamping down the coupling segments 200a,b, or the transition portions 272,274,276,278 of the inner surface 202a,b of each coupling segment 200a,b can come into partial or complete contact with the outer surfaces 111,121 of the pipe elements 110,120 in other aspects.

When the pipe coupling 100 is aligned on the joint of the pipe elements 110,120 as shown in FIG. 19E, the fastening devices 290a,b are used to draw the coupling segments 200a,b together. In one aspect, this takes the form of fastening devices 290a,b compressing the fastener pads 221,222 toward each other. In one aspect, the pipe coupling 100 is rigid and includes no deflection of the coupling segments 200a,b. In another aspect, the coupling segment is deformable between a non-assembled state and an assembled and tightened state, each coupling segment 200a,b of the pipe coupling 100 deflecting at least slightly when the pipe coupling 100 is tightened. In various aspects, when the coupling segments 200a,b travel toward each other and deform under the tightening of the fastening devices 290, the gasket 150 is deformed in accord therewith. In some embodiments, a rigid or semi-rigid gasket 150 may be included. The process for accommodating such a material may be altered from that described herein; for example and without limitation, however, the gasket 150 can comprise the deformation groove 517 to allow a place for material to flow upon deformation of the gasket 150.

Several features of the gasket 150 ease installation as described. Friction can cause installation of rubber gaskets to bind against outer surfaces 111,121 of pipe elements 110,120. With reference to the method shown FIGS. 19A-19E, axially outer drafted edges and axially inner drafted edges of the gasket 150 are both drafted to ease the pipe elements 110,120 into the coupling void 105. Axially outer drafted edges and axially inner drafted edges also help to prevent rollover of the sealing ridges 525a,b of the gasket 150 while sliding the pipe coupling 100 on and off, as the drafted profiles are less likely to bind against the outer surfaces 111,121 of the pipe elements 110,120. Additionally, sealing surfaces 526a,b are substantially parallel to the outer surfaces 111,121 of the pipe elements 110,120 even when the gasket 150 is not tightened against the pipe elements 110,120. Additionally, the axially outward position of the central rib 530 with respect to the sealing ridges 525a,b, prevents the central rib 530 from obstructing the installation of the pipe coupling 100 before deformation of the gasket 150. When the coupling segments 200a,b are clamped down, the gasket 150 deforms, and the central rib 530 contacts the outer surfaces 111,121 of the pipe elements 110,120. This configuration allows the gasket 150 to slide onto the pipe elements 110,120 without biasing the sliding in one direction and prevents binding of the sealing ridges 525a,b during installation. These features prevent the gasket 150 from rolling over when the pipe coupling 100 is installed on the pipe elements 110,120 and allows the gasket 150 to be properly placed over the joint between the pipe elements 110,120 for proper sealing, among other advantages. When the gasket 150 is properly aligned over the joint and engaged against the outer surfaces 111,121 of the pipe elements 110,120, each of the sealing members 557a,b may contact the outer surfaces 111,121.

Figure 20:
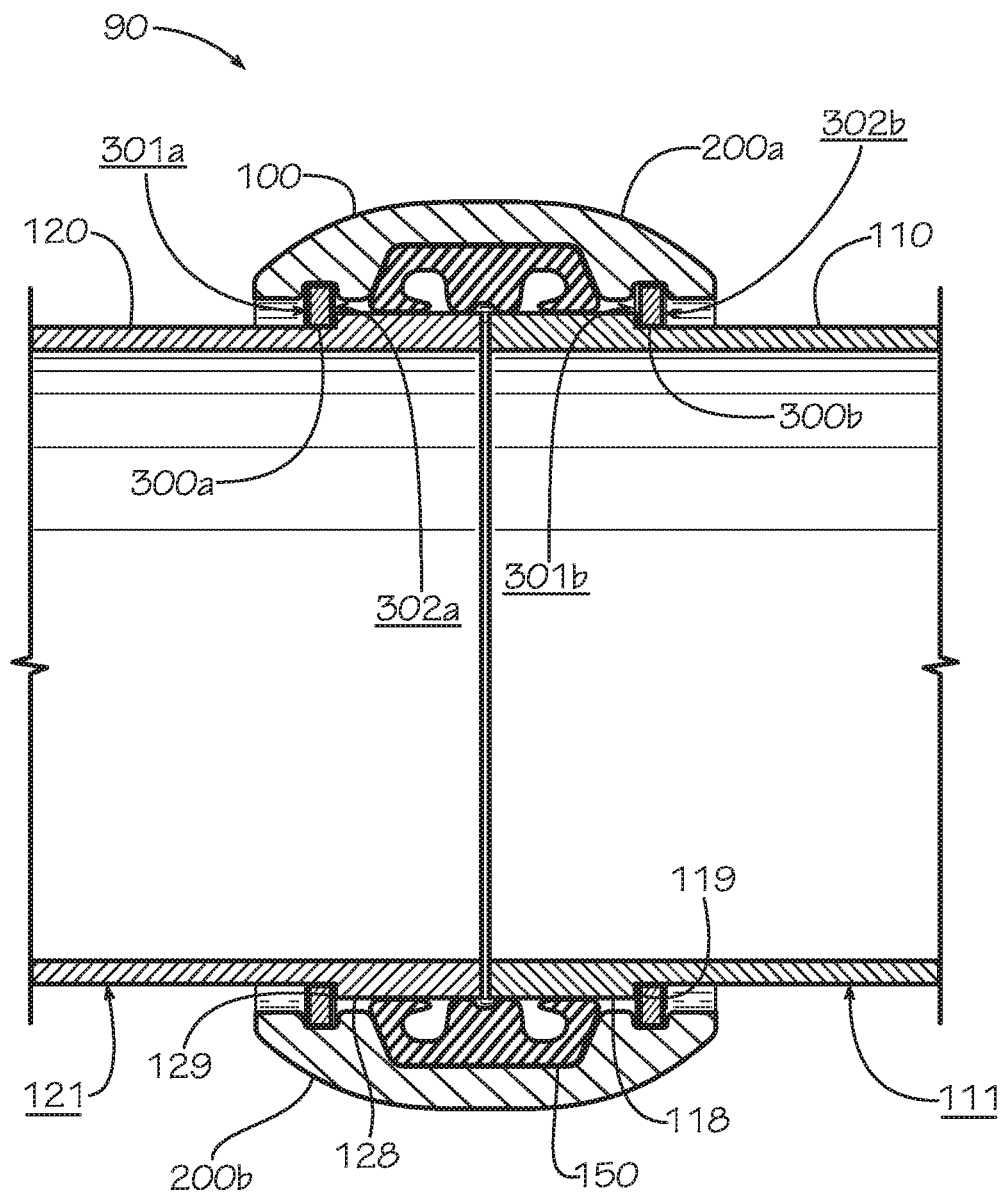
FIG. 20 is a sectional view of a pipe system with the pipe coupling tightened around and connecting the first pipe element and the second pipe element in accordance with another aspect of the current disclosure.

FIG. 20 again shows the pipe coupling 100 assembled and tightened around and connecting the pipe elements 110,120. The pipe elements 110,120 respectively comprise shoulders 118,128 defining sidewalls 119,129 instead of having connection grooves 112,122. One of the axial end surfaces 301a,b or the axial end surfaces 302a,b of each of the pipe connection rings 300a,b may contact one of the sidewalls 119,129 of the shoulders 118,128 to engage the pipe elements 110,120 when an internal or external force, such as fluid pressure with the pipe system 90, acts to separate the pipe elements 110,120. This contact prevents separation of either pipe element 110,120 from the pipe coupling 100 or from each other once the pipe coupling 100 is tightened. The pipe coupling 100 disclosed herein could be used with plain-end pipe elements as well that do not incorporate a connection groove 112,122 or a shoulder 118,128.

In one aspect, the pipe elements 110,120 are approximately the same diameter, although non-uniform diameter pipe elements may be joined in various embodiments. In one aspect, each of the pipe elements 110,120 has ends 115,125 that define a diameter equal to a diameter of the respective pipe elements 110,120. In another aspect, the ends 115,125 can be flared slightly. Connection grooves 112,122 can be formed using one or more of at least two methods: rolling and machining. If the connection grooves 112,122 are machined, the pipe elements 110,120 are less likely to have flares on the ends 115,125 and are more likely to resemble the geometry shown. If the connection grooves 112,122 are rolled, however, the pipe elements 110,120 are more likely to have ends 115,125 which are flared, though rolled pipe elements 110,120 may not have flares in other aspects. As such, the pipe coupling 100 can be made to accommodate the potential flaring of ends 115,125. When the ends 115,125 are flared, the pipe coupling 100 can be sized to fit over the largest possible flare of the ends 115,125 based on standard tolerancing for creating the connection grooves 112,122.

Figure 22:
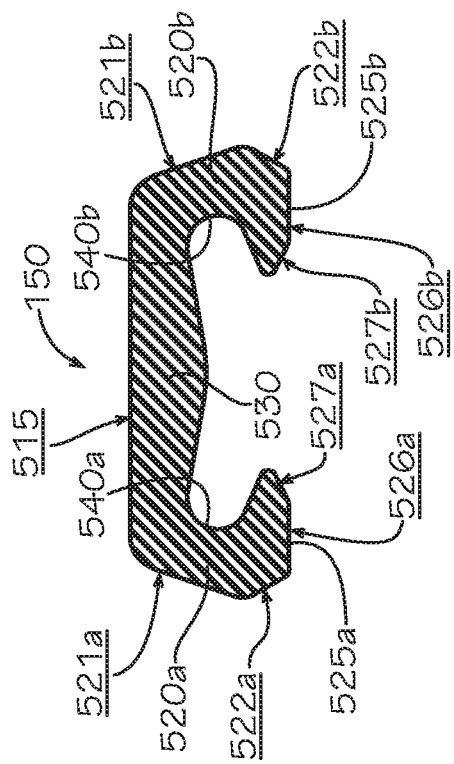
FIG. 22 is a sectional view of the gasket of FIG. 21 taken along line 22-22 in FIG. 21.
Figure 23:
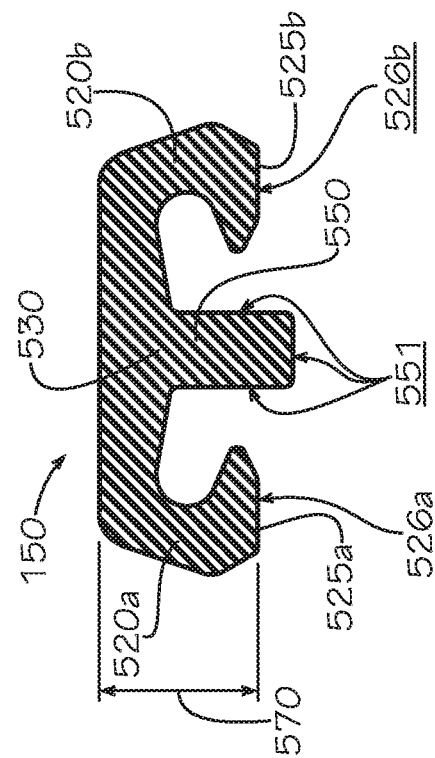
FIG. 23 is a sectional view of the gasket of FIG. 21 taken along line 23-23 in FIG. 21.
Figure 21:
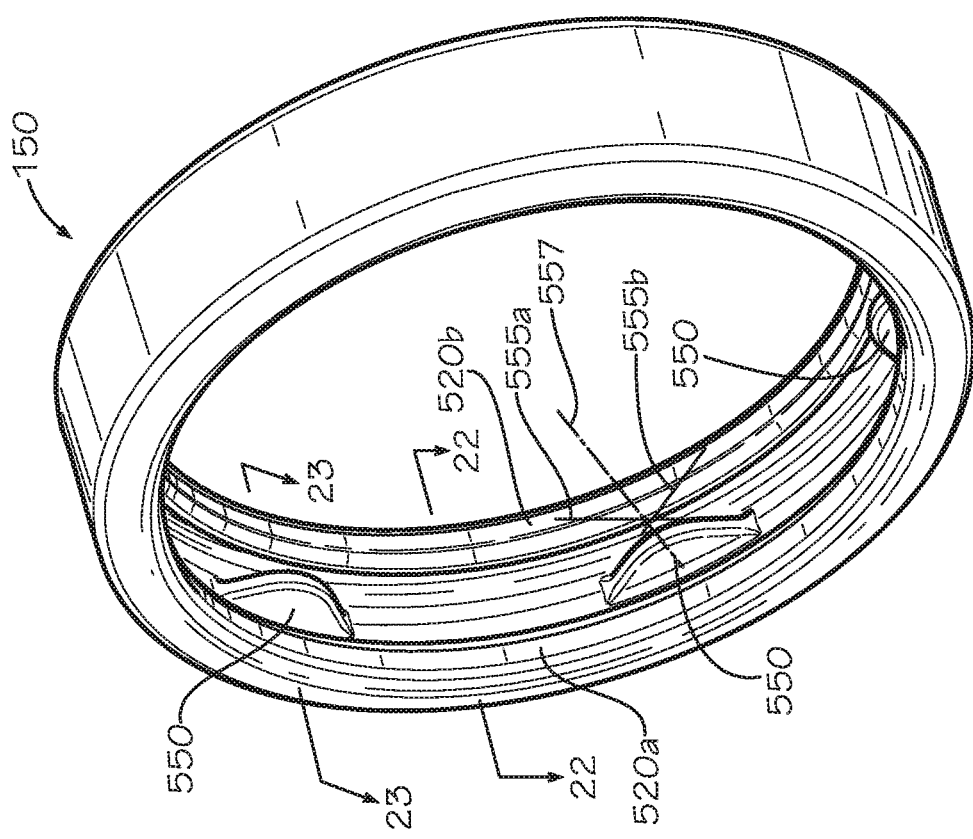
FIG. 21 is a perspective view of a gasket for use in a pipe coupling such as the pipe coupling of FIG. 1 in accordance with another aspect of the current disclosure.

In one aspect, the gasket 150 comprises the geometry shown in FIGS. 21 through 23 including a pair of sealing ribs 520a,b and a plurality of tabs 550 distributed circumferentially about and protruding from the central rib 530. In cross-section, the gasket 150 defines the overall height 570 measured from the radially outer surface 515 to the sealing surfaces 526a,b of the sealing ridges 525a,b. The overall height 570 can be reduced as shown—in comparison to the overall height 570 of the gasket 150 shown in FIG. 2. In one aspect, reducing the overall height 570 causes the gasket 150 to protrude radially outward less with respect to a given inner diameter of the gasket 150, giving the gasket 150 a lower profile to allow the coupling segments 200a,b and the pipe connection rings 300 to have smaller diameters to closer match the diameter of the pipes and thereby lower the amount of tightening necessary to engage the pipe elements 110,120.

In another aspect, reducing the overall height 570 causes the gasket 150 to protrude radially inward less than the distance shown in FIG. 2 relative to the respective inner surface 202a,b of the coupling segments 200a,b or the respective inner surfaces of the pipe connection rings 300a, b. By reducing the overall height 570 of the gasket 150 as shown, with or without the inclusion of the tabs 550, the pipe connection rings 300a,b of the pipe coupling 100 can be made to align with the connection grooves 112,122 or on the outside of the shoulders 118,128, at a point in the installation process before the gasket 150 contacts the pipe elements 110,120 or before the gasket 150 compresses significantly. In one aspect, a user may choose to rely on tactile sensation (i.e., may rely on "feel") in addition to or instead of visual clues to confirm proper alignment of the pipe coupling 100 with the pipe elements 110,120. In one aspect, tactile confirmation that both of the pipe connection rings 300a,b are simultaneously engaged in the connection grooves 112,122 or on the outside of the shoulders 118,128 will be more difficult as the gasket 150 compresses. Delaying compression of the gasket 150 can be achieved, for example and without limitation, by reducing the overall height 570 of the gasket 150.

In one aspect, as shown, each of the tabs 550 when bent individually and the plurality of tabs 550 when bent simultaneously are easily bendable in an axial direction so as not to interfere with installation of the gasket completely over the ends 115,125 of either of the pipe elements 110,120. In one aspect, an innermost diameter of the gasket 150, as measured to a radially inward facing portion of a tab surface 551, is less than the outer diameter of the pipe elements 110,120. When sliding a gasket such as the gasket 150 shown in FIG. 23 completely over the end 115,125 of either of the pipe elements 110,120, one of the respective ends 115,125 of the pipe elements 110,120 contacts an axially outward facing portion of the tab surface 551 of each of the tabs 550, causing each of the tabs 550 to bend. When the gasket 150 is slid back in the other direction, including when the pipe elements 110,120 are positioned end-to-end but with a slight gap, the tabs 550 will unbend and extend into the gap between the pipe elements 110,120. In such aspect, axially outward facing portions of the tabs 550 face axially outward facing portions of the respective ends 115,125 of the pipe elements 110,120. The tabs 550 can thus engage the ends 115,125 to separate the end 115 from the end 125 and to provide proper spacing for the pipe connection rings 300a,b to align with the connection grooves 112,122. The gap created between the end 115 and the end 125 by the tabs 550 can be at least equal to an axial thickness of the tab 550 as viewed in cross-section such as in FIG. 23. The geometry of the pipe elements 110,120 and or features of the pipe coupling 100 can be adjusted as necessary to accommodate the axial thickness of the tab 550 including additional space for any manufacturing tolerances.

In one aspect, each of the tabs 550 bends easily when the gasket 150 is slid completely over the end 115,125 of one of the pipe elements 110,120 because each of the tabs 550 is rounded on each axially outward edge. In another aspect, each of the tabs 550 bends easily in the described condition because each tab 550 is separate and distinct from every other tab 550 and therefore bending of each of the tabs 550 in an axial direction does not require the simultaneously stretching or deformation of any material adjacent to the tab 550—such as would be the case were the geometry of the tab 550 such as that shown in FIG. 23 to continue circumferentially around the gasket 150. In one aspect, when the gasket 150 is viewed along its axis, each of the tabs 550 also tapers from the central rib 530, defining taper tangent lines 555a,b extending toward a radially inward facing portion of the tab surface 551 and angled with respect to a line 557 extending through a center of the gasket. With this taper, the cross-sectional area of the tab 550 effectively decreases towards the radially inward facing portion of the tab surface 551 and therefore less force is required to cause the tab 550 to bend at the radially inward facing portion of the tab surface than is required to cause the tab 550 to bend proximate to its connection to the central rib 530. In addition, because the taper on each tab 550 causes less surface area of each of the tabs 550 to contact the pipe elements 110,120, the frictional forces created when sliding the gasket 150 completely over either of the respective ends 115,125 of the pipe elements 110,120 are reduced. In one aspect, for example and without limitation, the circumferential length of the gasket including tabs 550 can be less than the circumferential length of the gasket not including tabs. In one aspect, a total of six tabs 550 are evenly spaced circumferentially around the gasket 150, where each tab 550 is spaced apart from each adjacent tab by an angle of 60°. In another aspect, a smaller quantity or a greater quantity of tabs 550 are spaced circumferentially around the gasket 150, and the tabs 550 need not be spaced evenly. In one aspect, an intersection between the tab surface 551 and a radially inward facing surface of the gasket 150 includes a radius or other fillet, reducing or eliminating any stress concentration at the intersection.

In one aspect, each of the sealing ribs 520a,b extends substantially radially inwardly and increases in thickness from a radially outside position to a radially inside position. In one aspect, each of the sealing ribs 520a,b defines an axially outer surface 521a,b extending from the radially outer surface 515 to an end of an axially outer drafted surface 522a,b, respectively. Each of the axially outer surfaces 521a,b is angled or slanted with respect to a radial direction of the gasket 150. The angle of each of the axially outer surfaces 521a,b is consistent around the circumference of the gasket 150, so that each of the axially outer surfaces 521a,b is shaped as a truncated cone. In one aspect as shown, each of the axially outer surfaces 521,a,b is angled, for example and without limitation, between about 19° and about 22° degrees with respect to a radial direction.

Each of the axially outer drafted surfaces 522a,b extends from an axially outermost edge of the gasket 150 to the corresponding sealing surface 526a,b. In one aspect, each of the axially outer drafted surfaces 522a,b may be rounded, slanted, or have any one of various other shapes in cross-section. In one aspect, such cross-sectional shapes translate to the three-dimensional shape of a cone or a paraboloid. Such shapes are truncated, as a full cone or paraboloid would not typically allow insertion of pipe elements in the gasket 150. In one aspect as shown, each of the axially outer drafted surfaces 522a,b is angled, for example and without limitation, between about 27° and about 28° with respect to a radial direction. Extending from each of the sealing surfaces 526a,b is an axially inner drafted surface 527a,b. In one aspect, each of the axially inner drafted surfaces 527a,b may be rounded, slanted, or have any one of various other shapes in cross-section. In one aspect, such cross-sectional shapes translate to the three-dimensional shape of a cone or a paraboloid. Such shapes are truncated, as a full cone or paraboloid would not typically allow insertion of pipe elements in the gasket 150. Each of the axially inner drafted surfaces 527a,b defines the termination of the sealing ridge 525a,b along an axially inward direction.

Figure 25:
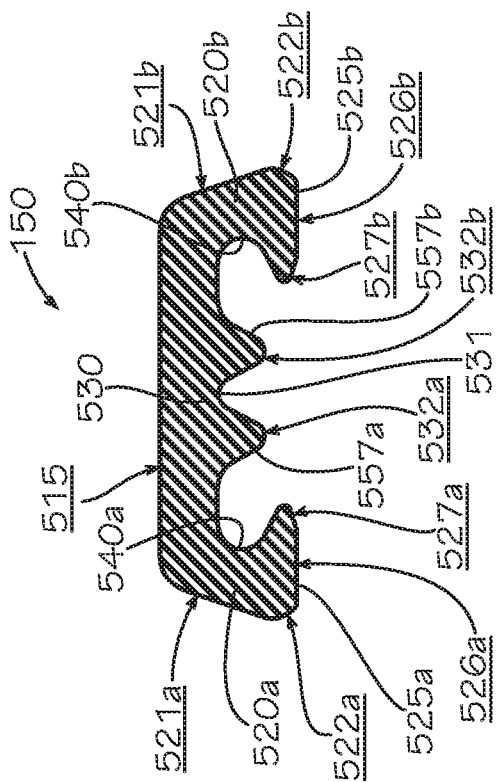
FIG. 25 is a sectional view of the gasket of FIG. 24 taken along line 25-25 in FIG. 24.
Figure 26:
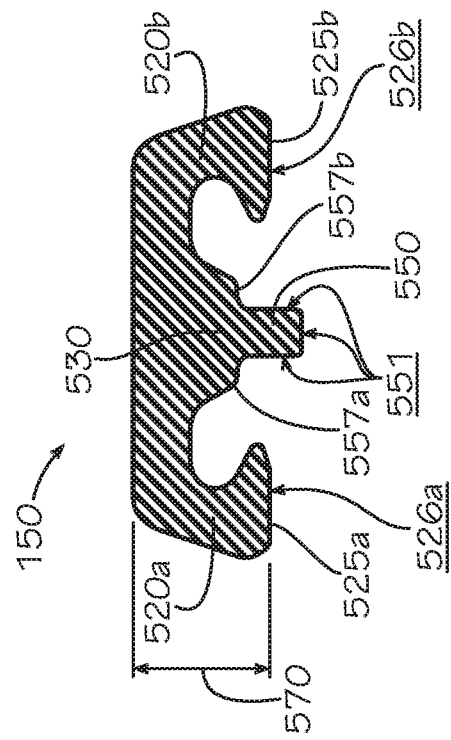
FIG. 26 is a sectional view of the gasket of FIG. 24 taken along line 26-26 in FIG. 24.
Figure 24:
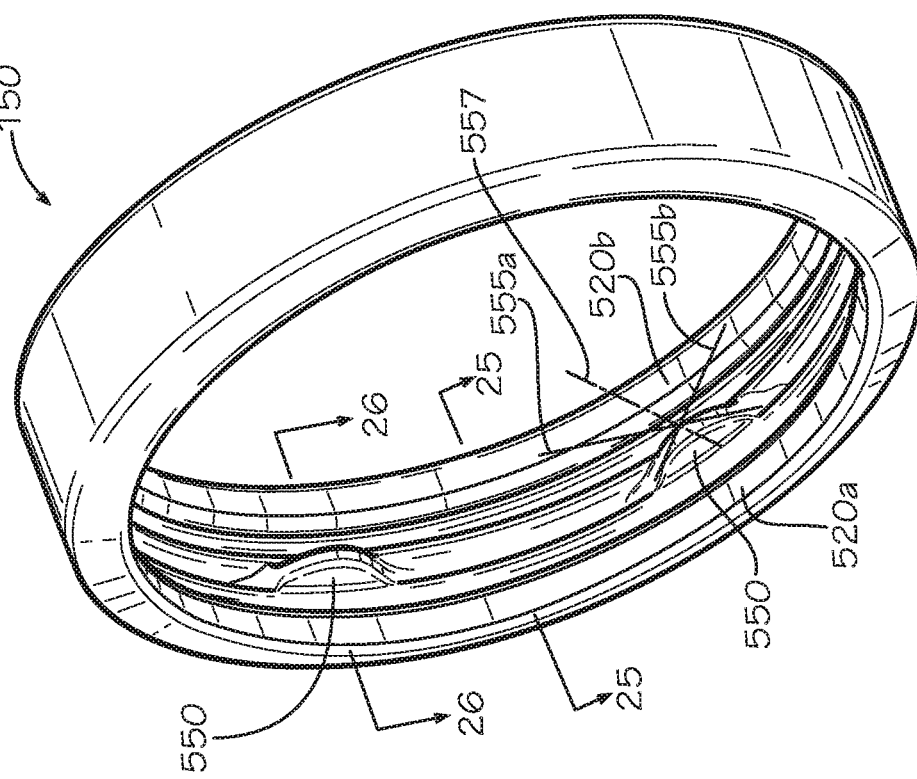
FIG. 24 is a perspective view of a gasket for use in a pipe coupling such as the pipe coupling of FIG. 1 in accordance with yet another aspect of the current disclosure.

In another aspect, the gasket 150 comprises the geometry shown in FIGS. 24 through 26 including the pair of sealing ribs 520a,b and the plurality of tabs 550 distributed circumferentially about and protruding from the central rib 530. In one aspect, each of the tabs 550 is positioned axially between the sealing member 557a and the sealing member 557b. In one aspect, the overall height 570 can be further reduced as shown—in comparison to the overall height 570 of the gasket 150 shown in FIG. 2 and in comparison to the overall height 570 of the gasket 150 shown in FIG. 23. In one aspect, reducing the overall height 570 causes the gasket 150 to protrude radially outward less with respect to a given inner diameter of the gasket 150, giving the gasket 150 a lower profile to allow the coupling segments 200a,b and the pipe connection rings 300 to have smaller diameters to closer match the diameter of the pipes and thereby lower the amount of tightening necessary to engage the pipe elements 110,120.

In another aspect, reducing the overall height 570 causes the gasket 150 to protrude radially inward by less than the distances shown in FIGS. 2 and 23 relative to the respective inner surface 202a,b of the coupling segments 200a,b or the respective inner surfaces of the pipe connection rings 300a,b.

In one aspect, a method of installing the pipe coupling 100 in the pipe system 90 comprises connecting the first pipe element 110 to the second pipe element 120. In one aspect, this method comprises sliding the assembled pipe coupling 100 over the end 115 of the first pipe element 110, the pipe coupling 100 comprising a coupling segment 200 and a pipe connection ring 300, the coupling segment 200 having an inner surface 202 defining a ring groove 250, the pipe connection ring 300 disposed within the ring groove 250, the pipe connection ring 300 being a closed ring. In one aspect, the method further comprises compressing the pipe connection ring 300 in a radial direction to engage the first pipe element 110.

In one aspect, compressing the pipe connection ring 300 in a radial direction comprises engaging a connection groove 112,122 defined in the first pipe element 110 proximate to an end 115 of the first pipe element 110 by compressing the pipe connection ring 300 such that an overall inner diameter equaling twice the overall inner radius 1091 of the pipe connection ring 300 becomes smaller than an outer diameter of the first pipe element 110. In one aspect, compressing the pipe connection ring 300 further comprises tightening a fastening device 290 of the pipe coupling 100 to bring the coupling segment 200 closer to the first pipe element 110.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A pipe system comprising:
  a first pipe element defining a first connection groove;
  a second pipe element defining a second connection groove; and
  a pipe coupling connecting an end of the second pipe element to an end of the first pipe element, the pipe coupling comprising:
    a first coupling segment defining an inner surface;
    a second coupling segment defining an inner surface, the inner surface of the first coupling segment and the inner surface of the second coupling segment defining:
      a first ring groove proximate to a first axial end of each of the first coupling segment and the second coupling segment, the inner surface of the first coupling segment and the inner surface of the second coupling segment comprising a transition portion on either axial side of the first ring groove, the first ring groove defining a groove bottom surface positioned radially outward from each of the transition portions; and
      a second ring groove proximate to a second axial end of each of the first coupling segment and the second coupling segment, the inner surface of the first coupling segment and the inner surface of the second coupling segment comprising a transition portion on either side of the second ring groove, the second ring groove defining a groove bottom surface positioned radially outward from each of the transition portions proximate to the second ring groove;

a first pipe connection ring disposed within the first ring groove and engaged with the first connection groove of the first pipe element, the first pipe connection ring comprising:
- an outer flange of the first pipe connection ring aligned with an axial direction of the first pipe connection ring and received within the first ring groove; and
- an inner flange of the first pipe connection ring connected to the outer flange and angled with respect to the outer flange; and a second pipe connection ring disposed within the second ring groove and engaged with the second connection groove of the second pipe element, the second pipe connection ring comprising:
- an outer flange of the second pipe connection ring aligned with an axial direction of the second pipe connection ring and received within the second ring groove; and
- an inner flange of the second pipe connection ring connected to the outer flange of the second pipe connection ring and angled with respect to the outer flange of the second pipe connection ring.

2. The pipe system of claim 1, wherein each of the first pipe connection ring and the second pipe connection ring is a closed ring.

3. The pipe system of claim 1, wherein the first connection groove of the first pipe element is defined proximate to the end of the first pipe element.

4. The pipe system of claim 1, wherein ends of the inner flange of each of the first pipe connection ring and the second pipe connection ring define a straight edge facing an axial end of the respective pipe connection ring.

5. The pipe system of claim 1, wherein an inner diameter of each of the first coupling segment and the second coupling segment is greater than an outer diameter of the first pipe element when the pipe system is in an assembled and tightened state.

6. The pipe system of claim 1, wherein the pipe coupling further comprises a gasket disposed within a gasket groove defined in the inner surface of each of the first coupling segment and the second coupling segment, the gasket comprising a plurality of tabs extending into a gap defined between the end of the first pipe element and the end of the second pipe element.

7. The pipe system of claim 1, wherein the outer flange of the first pipe connection ring contacts a groove bottom segment of the first ring groove.

8. The pipe system of claim 1, wherein the groove bottom surface of the first ring groove is parallel to an axial direction of the pipe coupling.

* * * * *